United States Patent
Wright

(10) Patent No.: US 12,170,360 B2
(45) Date of Patent: Dec. 17, 2024

(54) BATTERY MODULES COMPRISING IMMERSION-COOLED PRISMATIC BATTERY CELLS AND METHODS OF FABRICATING THEREOF

(71) Applicant: DIMAAG-AI, Inc., Fremont, CA (US)

(72) Inventor: Ian Wright, Woodside, CA (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 18/418,102

(22) Filed: Jan. 19, 2024

(65) Prior Publication Data

US 2024/0250341 A1  Jul. 25, 2024

Related U.S. Application Data

(60) Provisional application No. 63/480,710, filed on Jan. 20, 2023.

(51) Int. Cl.
*H01M 10/6568* (2014.01)
*H01M 50/171* (2021.01)
(Continued)

(52) U.S. Cl.
CPC ..... *H01M 10/6568* (2015.04); *H01M 50/171* (2021.01); *H01M 50/209* (2021.01); *H01M 50/507* (2021.01)

(58) Field of Classification Search
None
See application file for complete search history.

(56) References Cited

U.S. PATENT DOCUMENTS 6,111,387 A     8/2000  Kouzu et al.
11,784,369 B1 * 10/2023  Wright ............... H01M 50/209
                                        429/50
(Continued)

FOREIGN PATENT DOCUMENTS

CN     216058294 U    3/2022

OTHER PUBLICATIONS

"Dry Break Quick Disconnects", DCX The Liquid Cooling Company; Retrieved from the Internet on Mar. 9, 2023: https://dcx.eu/quick-disconnects/.
(Continued)

*Primary Examiner* — Amanda J Barrow
(74) *Attorney, Agent, or Firm* — Polygon IP, LLP

(57) ABSTRACT

Described herein are battery modules comprising immersion-cooled prismatic battery cells and methods of fabricating thereof. A battery module comprises prismatic battery cells that are stacked along the primary module axis. The module also comprises top, bottom, and side covers and two end plates, collectively enclosing these battery cells. Each cover forms two fluid channels, both fluidically open to the prismatic battery cells. Furthermore, the module comprises bus bars that interconnect the cell terminals and protrude into the fluid channels formed by the top cover. One end plate comprises two fluid ports for connecting to a thermal management system. Each port is fluidically coupled to one fluid channel, formed by the top cover, and one fluid channel, formed by the bottom cover. The other end plate fluidically couples the two fluid channels, formed by the top cover, and, separately, the two fluid channels, formed by the bottom cover.

20 Claims, 12 Drawing Sheets

(51) Int. Cl.
*H01M 50/209* (2021.01)
*H01M 50/507* (2021.01)

(56) References Cited

U.S. PATENT DOCUMENTS

| | | | |
|---|---|---|---|
| 2010/0104927 A1 | 4/2010 | Albright | |
| 2014/0111161 A1 | 4/2014 | Kim | |
| 2014/0141298 A1 | 5/2014 | Michelitsch | |
| 2015/0122562 A1 | 5/2015 | Miyashiro | |
| 2015/0357684 A1 | 12/2015 | Willgert et al. | |
| 2016/0268564 A1 | 9/2016 | Cho et al. | |
| 2016/0272043 A1 | 9/2016 | Cheng | |
| 2017/0232865 A1 | 8/2017 | Christen et al. | |
| 2017/0077566 A1 | 9/2017 | Mascianica et al. | |
| 2019/0379093 A1 | 12/2019 | Choi et al. | |
| 2020/0185793 A1 | 6/2020 | Itaya et al. | |
| 2020/0266403 A1* | 8/2020 | Stuetz | H01M 50/209 |
| 2020/0266507 A1* | 8/2020 | Brunnsteiner | H01M 10/6568 |
| 2020/0287181 A1 | 9/2020 | You et al. | |
| 2022/0045388 A1* | 2/2022 | Coupar | H01M 10/6567 |
| 2023/0059541 A1* | 2/2023 | Yoon | H01M 10/6556 |
| 2023/0238611 A1* | 7/2023 | Gao | H01M 10/625 429/120 |
| 2023/0238814 A1 | 7/2023 | Lu et al. | |
| 2023/0246266 A1* | 8/2023 | Andruskiewicz, IV | H01M 10/613 429/62 |

OTHER PUBLICATIONS

U.S. Appl. No. 18/182,912, Non Final Office Action mailed May 19, 2023, 23 pgs.

U.S. Appl. No. 18/182,912, Notice of Allowance mailed Jun. 22, 2023, 7 pgs.

"Series HC: Clean-break couplings for high-pressure hydraulic applications", Walther-Prazision; Retrieved from the Internet on Jan. 18, 2024: https://www.walther-praezision.de/en/products/mono_couplings/clean_break_up_to_650_bar_10000_psi/series_hc/index.html.

Dubey et al "Direct Comparison of Immersion and Cold-Plate Based Cooling for Automotive Li-Ion Battery Modules"—Energies Feb. 25, 2021, 14, 1259.

Luo et al., "Experimental and Simulative Investigations on a Water Immersion Cooling System for Cylindrical Battery Cells"—Front. Energy Res. Feb. 2022, vol. 10, Article 803882.

Roe et al., "Immersion cooling for lithium-ion batteries—A review" Journal of Power Sources, vol. 525, Mar. 30, 2022, 231094.

Solai et al., "Validation of a data-driven fast numerical model to simulate the Immersion Cooling of a Lithium-ion Battery Pack" Energy, Elsevier, Jun. 15, 2022, vol. 249, 123633.

Wilhelm, Grant, "6 traits of non-spill connectors", Connector Tips Editor, Feb. 3, 2015; Retrieved from the Internet: https://www.connectortips.corn/6-traits-non-spill-connectors/.

U.S. Appl. No. 18/402,347, Non Final Office Action mailed Apr. 2, 2024, 19 pgs.

* cited by examiner

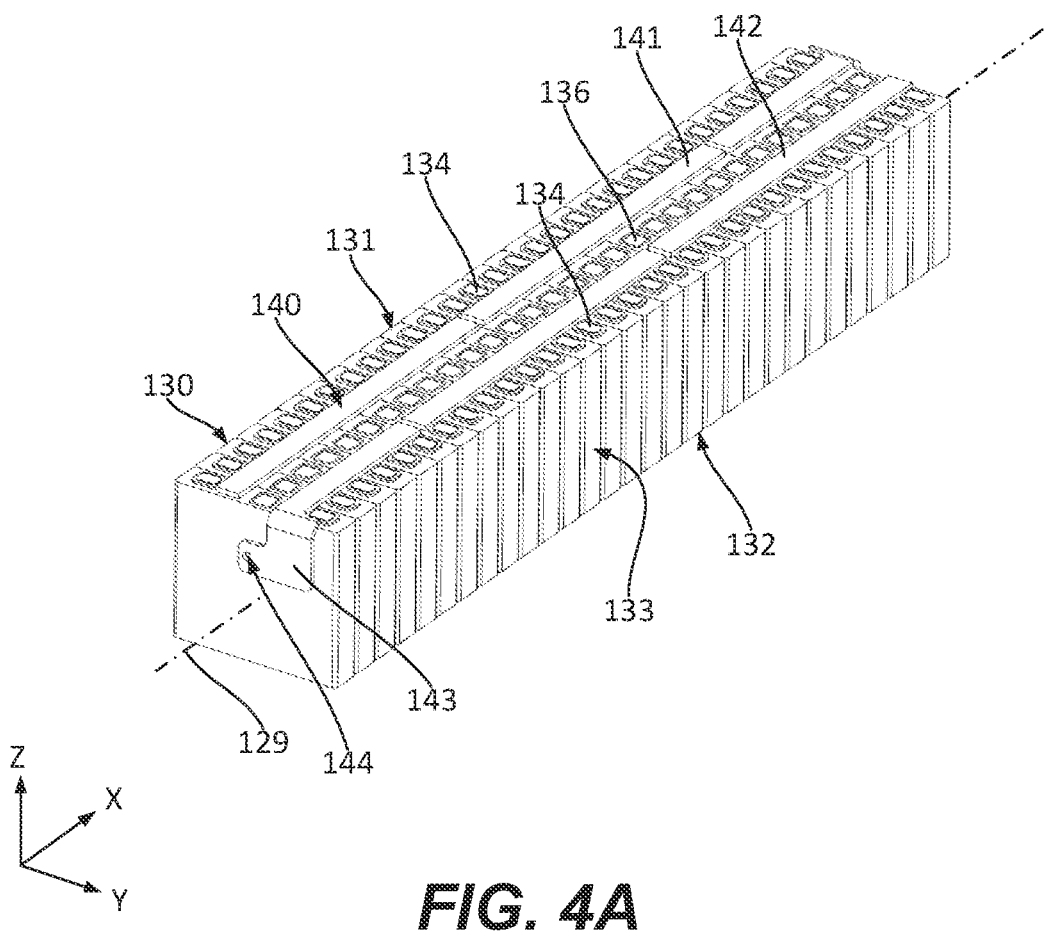
FIG. 4A
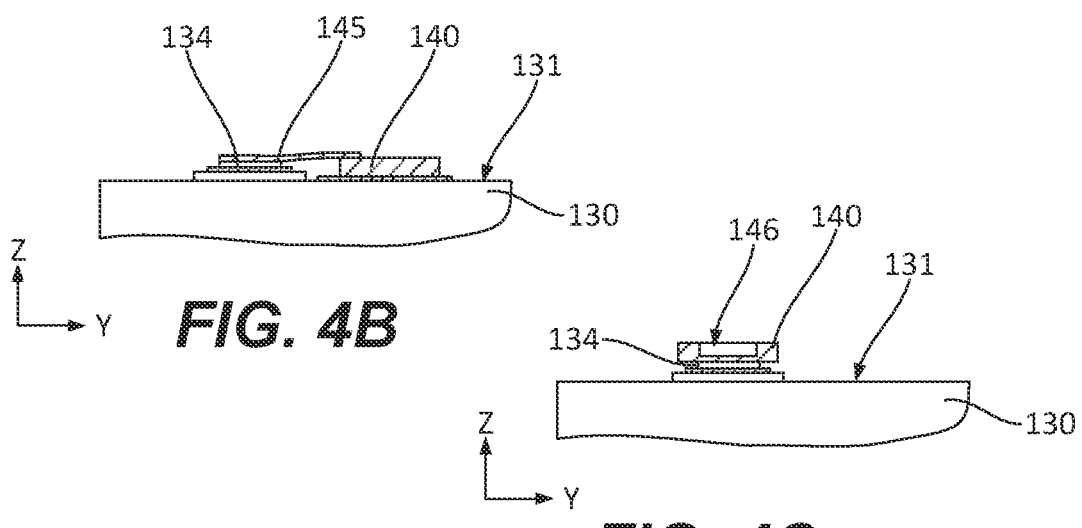
FIG. 4B
FIG. 4C

BATTERY MODULES COMPRISING IMMERSION-COOLED PRISMATIC BATTERY CELLS AND METHODS OF FABRICATING THEREOF

CROSS-REFERENCE TO RELATED APPLICATIONS

This application claims the benefit under 35 U.S.C. § 119(e) of U.S. Provisional Patent Application 63/480,710, filed on 2023 Jan. 20, which is incorporated herein by reference in its entirety for all purposes.

BACKGROUND

Electric vehicles are propelled using electric motors powered by battery packs. Each battery pack can include one or more battery modules, each comprising one or more battery cells. These cells can be connected in series and/or parallel and controlled by a battery management system. While the operating temperature of battery cells depends on various materials used to fabricate these cells (e.g., electrolyte solvents), most battery cells are designed to operate in the 0-60° C. range. It should be noted that battery cells can be very sensitive to their operating temperatures. For example, the power rating of battery cells can drop quickly with the temperature (caused by lower ionic mobility). At the same time, battery cells degrade faster and can potentially enter unsafe conditions when operated at high temperatures.

In addition to various environmental conditions that can change cells' operating temperature, battery cells can generate considerable heat while charging and discharging, especially at high rates (that can be desirable for many applications). For example, Joule heating caused by cells' internal resistance is one of the largest contributors. Other contributors include but are not limited to electrode reactions and entropic heat generation caused by the insertion and de-insertion of lithium ions in and out of the electrodes. To maintain optimum operating temperatures, the heat must be removed from the battery cells as this heat is being generated within the cells. It should be noted that other components of battery packs (e.g., bus bars that interconnect battery cells) can also cause heating and should be also cooled whenever possible.

Liquid cooling or, more generally, liquid-based thermal management of battery cells is beneficial in comparison to, e.g., air cooling because of the large heat capacities and heat transfer coefficient of many liquids in comparison to air. However, controlling the distribution of liquid within battery packs can be challenging. For example, most liquid-cooled battery packs have battery cells isolated from liquid passages thereby preventing any direct contact between the cells and thermal liquid and relying on various heat-transferring components positioned in between. Furthermore, many liquid-cooled battery packs utilize cylindrical cells (e.g., 18650 cells) because of their small factor and ease of cooling (e.g., by thermal coupling to cell bottoms). However, battery packs with cylindrical cells tend to have lower energy density because of their inherent packing density limitations. Finally, most battery cooling systems focus on cooling batteries and ignore bus bar cooling.

What is needed are new battery modules comprising immersion-cooled prismatic battery cells and methods of fabricating thereof.

SUMMARY

Described herein are battery modules comprising immersion-cooled prismatic battery cells and methods of fabricating thereof. A battery module comprises prismatic battery cells that are stacked along the primary module axis. The module also comprises top, bottom, and side covers and two end plates, collectively enclosing these battery cells. Each cover forms two fluid channels, both fluidically open to the prismatic battery cells. Furthermore, the module comprises bus bars that interconnect the cell terminals and protrude into the fluid channels formed by the top cover. One end plate comprises two fluid ports for connecting to a thermal management system. Each port is fluidically coupled to one fluid channel, formed by the top cover, and one fluid channel, formed by the bottom cover. The other end plate fluidically couples the two fluid channels, formed by the top cover, and, separately, the two fluid channels, formed by the bottom cover.

Clause 1. A battery module for immersion cooling using a thermal liquid, the battery module comprising: prismatic battery cells stacked along a primary axis of the battery module and comprising top surfaces, bottom surfaces opposite to top surfaces, side surfaces extending between the top surfaces and the bottom surfaces, and cell terminals positioned on the top surfaces; bus bars forming a first bus-bar row and a second bus-bar row and interconnecting the cell terminals; a top cover attached to the prismatic battery cells, facing the top surfaces, and forming a first top fluid channel and a second top fluid channel for flowing the thermal liquid, wherein: the first top fluid channel is fluidically open to each of the prismatic battery cells thereby allowing the thermal liquid to directly contact each of the prismatic battery cells while flowing through the first top fluid channel, and the second top fluid channel is fluidically open to each of the prismatic battery cells thereby allowing the thermal liquid to directly contact each of the prismatic battery cells while flowing through the second top fluid channel; a bottom cover attached to the prismatic battery cells, facing the bottom surfaces, and forming a first bottom fluid channel and a second bottom fluid channel for flowing the thermal liquid, wherein: the first bottom fluid channel is fluidically open to each of the prismatic battery cells thereby allowing the thermal liquid to directly contact each of the prismatic battery cells while flowing through the first bottom fluid channel, and the second bottom fluid channel is fluidically open to each of the prismatic battery cells thereby allowing the thermal liquid to directly contact each of the prismatic battery cells while flowing through the second bottom fluid channel; a first end plate attached to both the top cover and the bottom cover and comprising a first fluid port and a second fluid port, wherein: the first fluid port is fluidically coupled to both the first top fluid channel and the first bottom fluid channel such that the thermal liquid is distributed to the first top fluid channel and the first bottom fluid channel upon entering the first fluid port, and the second fluid port is fluidically coupled to both the second top fluid channel and the second bottom fluid channel such that the thermal liquid is collected from the second top fluid channel and the second bottom fluid channel prior to leaving the battery module through the second fluid port; and a second end plate attached to both the top cover and the bottom cover, wherein: the second end plate fluidically interconnects the first top fluid channel and the first bottom fluid channel, and the second end plate fluidically interconnects the second top fluid channel and the second bottom fluid channel.

Clause 2. The battery module of clause 1, wherein each of the top surfaces, the bottom surfaces, and the side surfaces is substantially parallel to the primary axis.

Clause 3. The battery module of clause 1, wherein each adjacent pair of the prismatic battery cells is mechanically interconnected by an adhesive layer extending between the prismatic battery cells in each adjacent pair.

Clause 4. The battery module of clause 1, wherein each of the prismatic battery cells has a height, length, and a thickness such that the thickness is less than each of the height and the length and such that the thickness is parallel to the primary axis of the battery module.

Clause 5. The battery module of clause 1, wherein the bus bars and the cell terminals extend into the first top fluid channel and the second top fluid channel thereby being in direct contact with a thermal liquid.

Clause 6. The battery module of clause 1, wherein: the prismatic battery cells further comprise pressure-release burst valves, positioned on the top surfaces, the top cover forms a gas-venting channel fluidically open to the pressure-release burst valves, the gas-venting channel is positioned between and fluidically isolated from each of the first top fluid channel and the second top fluid channel.

Clause 7. The battery module of clause 1, wherein: the first bus-bar row comprises a first contact plate, extending perpendicular to the primary axis between the prismatic battery cells and the first end plate, the first end plate comprises a first contact opening overlapping with the first contact plate.

Clause 8. The battery module of clause 1, further comprising side covers facing the side surfaces of the prismatic battery cells, each attached to the top cover and to the bottom cover.

Clause 9. The battery module of clause 8, wherein the bottom cover comprises side lips, overlapping with and glued to the side covers.

Clause 10. The battery module of clause 8, wherein: each of the side covers comprises a first lip and a second lip extending perpendicular to the primary axis; the first lip overlaps with and attached to the first end plate such that a portion of the first end plate extends between the first lip and the prismatic battery cells; and the second lip overlaps with and is attached to the second end plate such that a portion of the second end plate extends between the second lip and the prismatic battery cells.

Clause 11. The battery module of clause 1, wherein the top cover is glued to at least the top surfaces or the side surfaces of the prismatic battery cells.

Clause 12. The battery module of clause 11, wherein the top cover is glued to both the top surfaces and the side surfaces of the prismatic battery cells.

Clause 13. The battery module of clause 1, wherein: the first end plate comprises a first reinforcement element and a first cover formed from different materials, the first cover is at least partially positioned between the first reinforcement element and the prismatic battery cells.

Clause 14. The battery module of clause 13, wherein: the first cover comprises a first-cover center portion and a first-cover outer protrusion, monolithic with and extending from the first-cover center portion away from the prismatic battery cells; the first-cover outer protrusion comprises multiple pieces separated by first-cover channels, extending through the first-cover outer protrusion to the first-cover center portion; and the first reinforcement element comprises a first reinforcement frame and a first reinforcement cross-member such that the first reinforcement frame surrounds the first-cover outer protrusion while the first reinforcement cross-member protrudes into the first-cover channels.

Clause 15. The battery module of clause 14, wherein the first reinforcement frame comprises four openings, each positioned in a different corner of the first reinforcement frame.

Clause 16. The battery module of clause 14, wherein: the first cover further comprises a first-cover inner protrusion, monolithic with and extending from the first-cover center portion toward the prismatic battery cells; and the first-cover inner protrusion extends into an opening formed by the top cover and the bottom cover and is attached to each of the top cover and the bottom cover.

Clause 17. The battery module of clause 16, wherein the first-cover inner protrusion comprises a cutout such that a portion of the first bus-bar row extends into the cutout.

Clause 18. The battery module of clause 16, wherein the first-cover inner protrusion comprises sealing extensions protruding into and sealing the first top fluid channel, the second top fluid channel, the first bottom fluid channel, and the second bottom fluid channel.

Clause 19. The battery module of clause 16, wherein: the first-cover inner protrusion comprises a first set of internal fluid channels fluidically coupling the first fluid port with both the first top fluid channel and the first bottom fluid channel, and the first-cover inner protrusion comprises a second set of internal fluid channels fluidically coupling the second fluid port with both the second top fluid channel and the second bottom fluid channel.

Clause 20. A method of fabricating a battery module, the method comprises: adhering prismatic battery cells stacked along a primary axis of the battery module and comprising top surfaces, bottom surfaces opposite to top surfaces, side surfaces extending between the top surfaces and the bottom surfaces, and cell terminals positioned on the top surfaces; attaching bus bars to the cell terminals, wherein the bus bars form a first bus-bar row and a second bus-bar row and interconnecting the cell terminals; attaching a top cover to the prismatic battery cells, facing the top surfaces, and forming a first top fluid channel and a second top fluid channel, each fluidically open to the prismatic battery cells; attaching a bottom cover attached to the prismatic battery cells, facing the bottom surfaces, and forming a first bottom fluid channel and a second bottom fluid channel, each fluidically open to the prismatic battery cells; attaching a first end plate to both the top cover and the bottom cover and comprising a first fluid port and a second fluid port, wherein the first fluid port is fluidically coupled to both the first top fluid channel and the first bottom fluid channel, and wherein the second fluid port is fluidically coupled to both the second top fluid channel and the second bottom fluid channel; and attaching a second end plate to both the top cover and the bottom cover and fluidically interconnecting the first top fluid channel and the first bottom fluid channel and, separately, fluidically interconnecting the second top fluid channel and the second bottom fluid channel.

BRIEF DESCRIPTION OF THE DRAWINGS

FIG. 4A is a schematic perspective view of a stack of prismatic battery cells and bus bars, in accordance with some examples.

FIGS. 4B and 4C are schematic cross-sectional side views of two types of connection between a bus bar and a cell terminal, in accordance with some examples.

DETAILED DESCRIPTION

Figure 1:
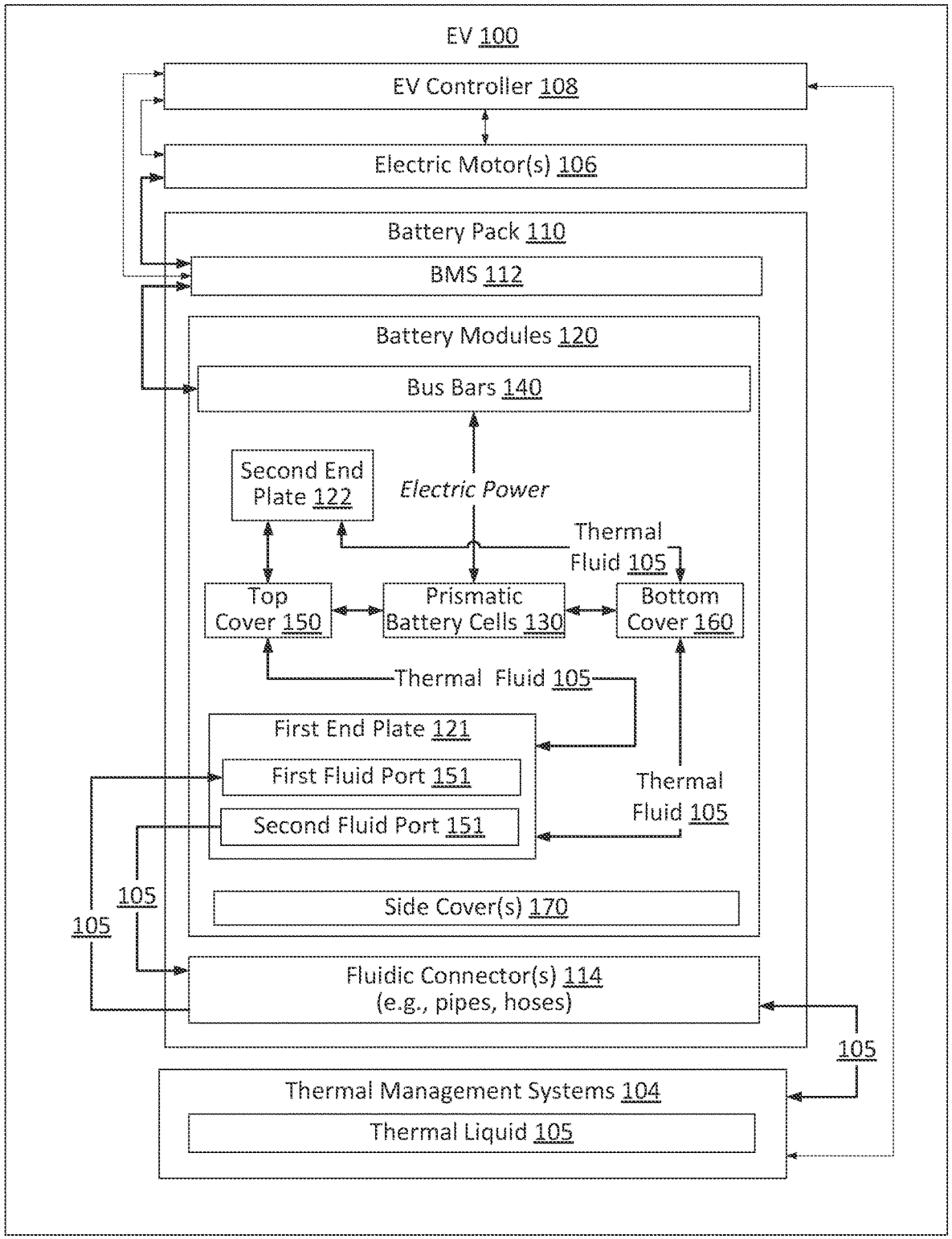
FIG. 1 is a block diagram of an electric vehicle comprising a battery pack having one or more battery modules with immersion-cooled battery cells, in accordance with some examples.

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

Introduction

As noted above, battery cells can be very sensitive to operating temperatures. At the same time, these temperatures can be influenced by the environment and by the cells' operation (e.g., self-heating). Liquid-based thermal management provides efficient ways of controlling the temperature of battery cells. However, the thermal coupling of battery cells and thermal liquids can be challenging. The immersion cooling of battery cells brings battery cells in direct contact with thermal liquids, which is beneficial for thermal transfer. The key challenges include controlling the distribution and flow of thermal liquids around battery cells and other components (e.g., bus bars).

Described herein are battery modules comprising immersion-cooled prismatic battery cells and methods of fabricating thereof. Specifically, each battery cell comes in direct contact with a thermal liquid (e.g., mineral oil such as transformer oil) at two locations on the top surfaces and two additional locations on the bottom surface. The thermal-liquid immersion cooling should be distinguished from other cooling methods where cooled elements do not come in contact with the cooling liquid (e.g., separated by other components) and/or gas-phase materials (e.g., air) are used for cooling. Immersion cooling involves the submersion of various battery module components into a thermal liquid (which may be also referred to as a dielectric liquid) to dissipate heat. The benefits of immersion cooling include but are not limited to (1) efficient heat dissipation and cooling uniformity (e.g., the liquid surrounding the submerged components absorbs heat more effectively, relative to air cooling, preventing overheating and ensuring optimal performance), (2) energy efficiency (e.g., requiring less power to flow the thermal liquid in comparison to flowing air to achieve the same level of cooling), (3) higher operating capabilities of battery module/higher heat dissipation rates (e.g., the thermal liquid coolant being a more efficient heat conductor than air), (4) silent operation (e.g., air cooling systems that involve fans and other mechanical components producing noise, immersion cooling is generally quieter), (5) space savings, (e.g., a higher hardware density and reduced need for extensive air cooling infrastructure can result in space savings). This is especially valuable in situations where physical space is limited or costly.

A battery module comprises at least a top cover and a bottom cover. Each cover is attached (e.g., glued) to the respective sides of the battery cells and forms two fluid channels, both fluidically open to the prismatic battery cells. Specifically, parts of the cells' top surfaces form one side of each top fluid channel. Similarly, parts of the cells' bottom surfaces form one side of each bottom fluid channel. It should be noted that the top and bottom are used in this description solely for differentiating purposes and not to indicate or limit the orientation of battery modules or each component. For example, depending on the orientation of battery modules, the bottom cover can be positioned above the top cover when a gravitational force is used as a reference. Furthermore, the module comprises bus bars that interconnect the cell terminals and protrude into the fluid channels formed by the top cover. As such, the thermal liquid comes in direct contact with the battery cells, bus bars, and any connections between the battery cells and bus bars (e.g., weld nuggets) thereby providing direct cooling of these components through the direct conduction between these elements and the thermal liquid. It should be noted that the thermal liquid experiences extensive convection within these channels, which further enhances the heat transfer.

Furthermore, a battery module comprises end plates such that the battery cells are stacked between the two end plates. One end plate comprises two fluid ports for connecting to a thermal management system. Each port is fluidically coupled to one fluid channel, formed by the top cover, and one fluid channel, formed by the bottom cover. The other end plate fluidically couples the two fluid channels, formed by the top cover, and, separately, the two fluid channels, formed by the bottom cover.

In some examples, battery cells are glued together for the structural integrity of the resulting battery module. The adhesive layers provided between the cells can also be used for the electrical isolation of battery cells and, to some extent, for the thermal isolation of the cells (both of which are safety measures). Furthermore, the direct attachment of the battery cells effectively provides some internal structural support (e.g., a module skeleton) and reduces the structural requirements from the external components, thereby reducing the weight/size of these components (and increasing the gravimetric/volumetric capacity of the module). The external support is provided by a combination of top, bottom, and side covers as well as end plates. These external components can be independently glued to the battery cells and also glued to each other. Furthermore, the end plates may have a dual-component configuration, e.g., operable as both a cover and a reinforcement element. The reinforcement element can be used for attaching the module to other components (e.g., other modules, anchor points in a battery pack, and the like), as described below with reference to FIGS. 8A-8B.

Examples of Electric Vehicles

Battery modules described herein can be used in battery packs of electric vehicles. FIG. 1 is a block diagram of electric vehicle 100 comprising battery pack 110 having one or more battery modules 120 with prismatic battery cells 130, in accordance with some examples. Prismatic battery cells 130 can be also referred to as immersion-cooled battery cells or, more specifically, liquid immersion-cooled battery cells because of their direct contact with thermal liquid 105 (e.g., with at least the top surfaces 131 and the bottom surfaces 132 of the prismatic battery cells 130). Likewise, battery modules 120 may be referred to as immersion-cooled battery module or, more specifically, liquid-immersion-cooled battery module. Specifically, thermal liquid 105 is pumped between thermal management system 104 and battery modules 120. Thermal management system 104 may include pumping means (e.g., a hydraulic pump) and means for thermally conditioning thermal liquid 105 (e.g., a radiator for releasing the heat from thermal liquid 105 to the environment, a heat pump, a heater, and the like). Various fluid connectors 114 (e.g., pipes, hoses) can be used for connecting thermal management system 104 and battery modules 120. In some examples, this connection can be flexible, allowing to move battery modules 120 or, more generally, to move battery pack 110 relative to thermal management system 104. For example, battery pack 110 can move relative to thermal management system 104 to change the center of gravity of electric vehicle 100 (for stability).

Electric vehicle 100 can comprise electric motor 106 that can be electrically coupled (e.g., through an inverter and control circuitry) to battery pack 110. Electric vehicle 100 can also comprise electric vehicle controller 108, which can be coupled to various other components of electric vehicle 100. In some examples, battery pack 110 has its own controller, e.g., battery management system 112, which can be communicatively coupled to electric vehicle controller 108. In some examples, electric motor 106 is also immersion-cooled, e.g., using the same thermal management system 104 that is used for cooling the battery module 120.

As noted above, battery module 120 comprises prismatic battery cells 130, top cover 150, bottom cover 160, side covers 170, first end plate 121, and second end plate 122, collectively enclosing these battery cells. Top cover 150 and bottom cover 160 form fluid channels to bring thermal liquid 105 in direct contact with prismatic battery cells 130. Thermal liquid 105 can be introduced to battery module 120 through first end plate 121, and first end plate 121 can distribute thermal liquid 105 among these fluid channels, formed by top cover 150 and bottom cover 160. Second end plate 122 interconnects each pair of these channels thereby providing a return path for thermal liquid 105. Additional aspects of battery module 120 will now be described with references to FIG. 2-8B.

Examples of Battery Modules

Figure 2:
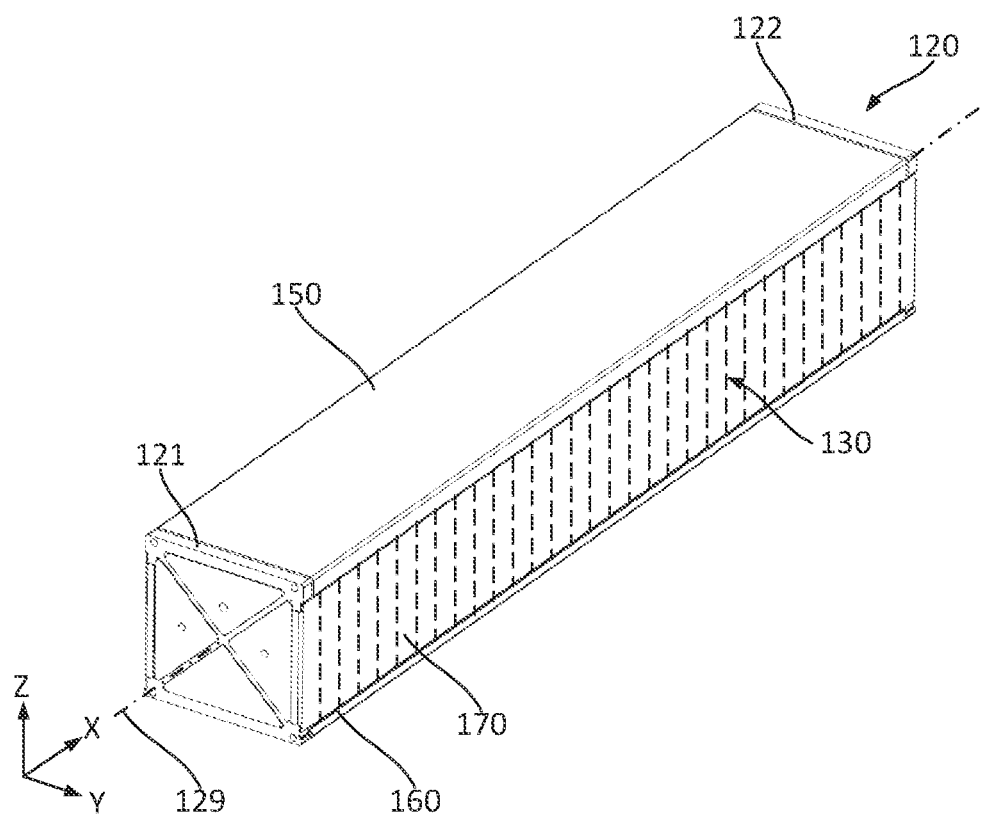
FIG. 2 is a schematic illustration of a battery module comprising immersion-cooled battery cells, in accordance with some examples.

FIG. 2 is a schematic illustration of battery module 120 comprising immersion-cooled battery cells 130, in accordance with some examples. Specifically, in the view of FIG. 2, prismatic battery cells 130 are hidden by other components such as top cover 150, bottom cover 160, side covers 170, first end plate 121, and second end plate 122. A combination of top cover 150, bottom cover 160, side covers 170, first end plate 121, and second end plate 122 enclose prismatic battery cells 130 and isolate prismatic battery cells 130 from the environment. The combination of top cover 150, bottom cover 160, first end plate 121, and second end plate 122 helps to provide immersion cooling to prismatic battery cells 130 as further described below.

Figure 3A:
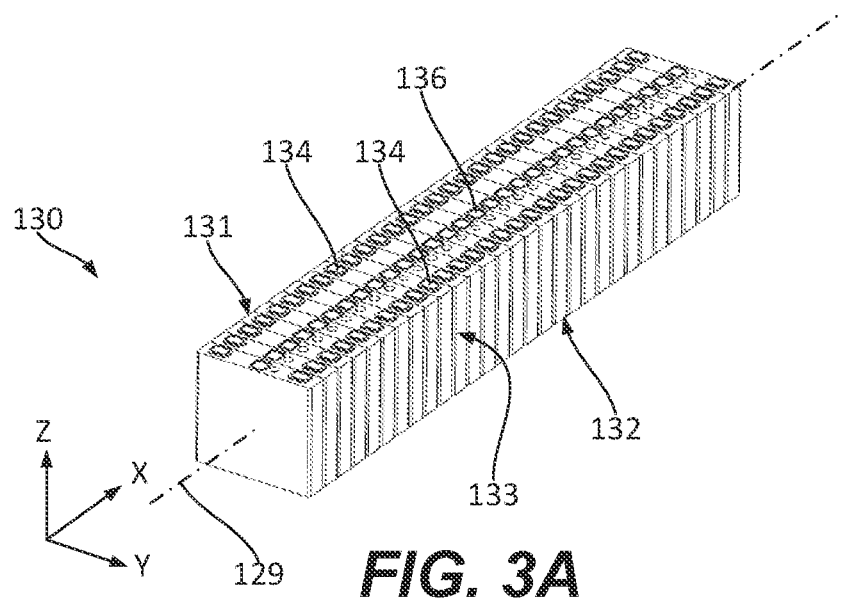
FIG. 3A is a schematic perspective view of a stack of prismatic battery cells, in accordance with some examples.
Figure 3B:
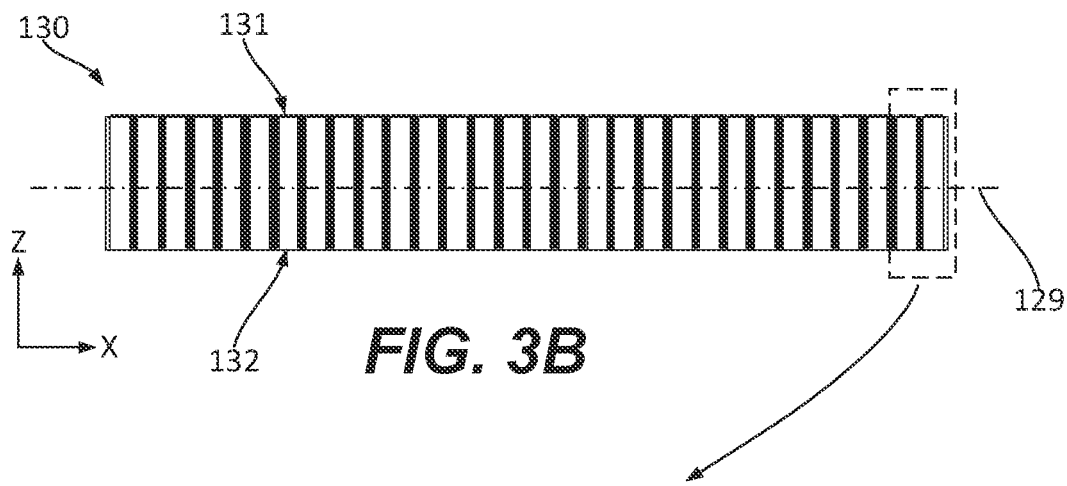
FIG. 3B is a schematic side view of the stack of prismatic battery cells in FIG. 3A, in accordance with some examples.

FIG. 3A is a schematic perspective view of a stack of prismatic battery cells 130, in accordance with some examples. Specifically, top cover 150, bottom cover 160, side covers 170, first end plate 121, and second end plate 122 are not shown in FIG. 3A. FIG. 3B illustrates a corresponding side view of that stack. While FIGS. 3A and 3B illustrate thirty (30) battery cells 130, one having ordinary skill in the art would understand that any number of cells can be used in one battery module 120.

Battery cells 130 used in battery module 120 are prismatic, rather than cylindrical. As noted above, prismatic battery cells 130 can be packed more compactly (with fewer spaces in between cells) within battery module 120 resulting in a higher density of battery module 120. For purposes of this description, a prismatic battery cell is defined as a cell having a shape of a rectangular prism (as opposed to a cylinder). As such, a prismatic battery cell has three distinct dimensions: (a) height, (b) width, and (c) thickness. In some examples, the height of prismatic battery cell 130 (used in battery module 120) is between 50 millimeters and 200 millimeters or, more specifically, between 75 millimeters and 125 millimeters. In the same or other examples, the width of prismatic battery cell 130 (used in battery module 120) is between 50 millimeters and 200 millimeters or, more specifically, between 75 millimeters and 125 millimeters. In some examples, the thickness of prismatic battery cell 130 (used in battery module 120) is between 5 millimeters and 50 millimeters or, more specifically, between 10 millimeters and 30 millimeters.

Prismatic battery cells 130 can be of various chemistry types, e.g., nickel-manganese-cobalt (NMC), lithium iron phosphate (LFP), and lithium titanate (LTO), at least based on the composition of positive electrodes. For example, lithium titanate (LTO) cells can support high charge-discharge rates, which may be particularly useful for industrial applications such as electric tractors, loaders, and the like.

Referring to FIGS. 3A and 3B, prismatic battery cells 130 are stacked along primary axis 129 of battery module 120. While FIG. 3A illustrates a single stack, the same battery module 120 may include multiple different stacks (e.g., positioned next to each other). Prismatic battery cells 130 comprise top surfaces 131, bottom surfaces 132 opposite to top surfaces 131, and side surfaces 133 extending between top surfaces 131 and bottom surfaces 132. For example, each top surface 131, bottom surface 132, and side surface 133 can be substantially parallel to primary axis 129. In some examples, each of prismatic battery cells 130 has a height, length, and thickness such that the thickness is less than the height and less than the length and such that the thickness is parallel to primary axis 129 of battery module 120. Prismatic battery cells 130 can be stacked along their thicknesses.

Prismatic battery cells 130 also comprise cell terminals 134 positioned on top surfaces 131. Cell terminals 134 are used to form electrical connections to prismatic battery cells 130. In some examples, cell terminals 134 are isolated from the other external components (e.g., the case, lid) of prismatic battery cells 130 such that these components are neutral. In some examples, prismatic battery cells 130 comprise pressure-release burst valves 136 configured to release gases from the interior of prismatic battery cells 130 when the pressure inside prismatic battery cells 130 exceeds a set threshold. In more specific examples, pressure-release burst valve 136 of each prismatic battery cell 130 is positioned between cell terminals 134 of that cell.

Figure 3C:
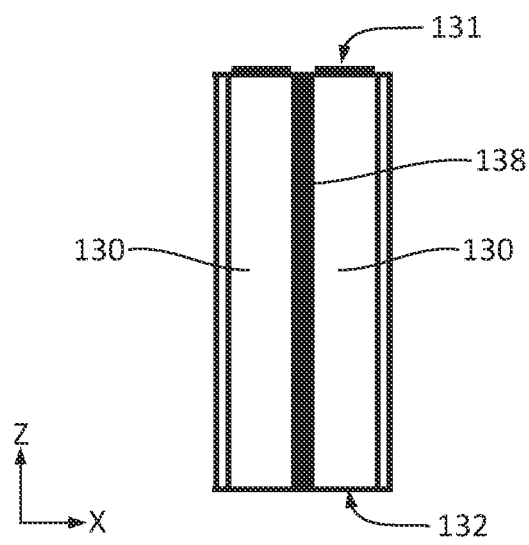
FIG. 3C is a schematic side view of two cells in the stack of prismatic battery cells in FIG. 3A, in accordance with some examples.

Referring to FIG. 3C, in some examples, two adjacent prismatic battery cells 130 are mechanically interconnected by adhesive layer 138 extending between prismatic battery cells 130 in each adjacent pair. Some examples of adhesive layer 138 include but are not limited to epoxy and polyurethane. The thickness of adhesive layer 138 can be used to accommodate variations in the cell thicknesses. For example, a pair of thin cells may have a thicker adhesive layer, while a pair of thick cells may have a thinner adhesive layer, such that the combined thickness is the same regardless of the cell thicknesses. Furthermore, flexible adhesives can be used to accommodate cell swelling (if any) during the operation of battery module 120. In some examples, adhesive layers 138 also provide electrical insulations between adjacent cells (e.g., even though the sides of battery cells 130 can be substantially neutral).

Adhesive layers 138 provide attachment/bonding between prismatic battery cells 130 in the set adding to the overall structural integrity of battery module 120. In other words, a combination of prismatic battery cells 130 and adhesive layers 138 is operable as an internal structural element (which can be referred to as a "skeleton") of battery module 120. Other components of battery module 120, e.g., top cover 150, bottom cover 160, and side covers 170 are operable as an internal structural element ("exoskeleton"). Furthermore, adhesive layers 138 provide electrical isolation and, in some examples, thermal isolation of adjacent prismatic battery cells 130. While the cases of prismatic battery cells 130 can be neutral, the electrical isolation can help to improve the overall module safety (e.g., when internal shorts develop in one or more prismatic battery cells 130).

Referring to FIG. 4A, battery module 120 comprises bus bars 140 interconnecting cell terminals 134. Bus bars 140 can be made from copper, aluminum, nickel, and other suitable conductive materials. While FIG. 4A illustrates one example of cell connections (i.e., 6p-5s connection scheme, in which each 6 prismatic battery cells 130 have parallel connections forming a set, and 5 such sets are interconnected in series), other examples are also within the scope. The connection scheme depends on the required voltage output of battery module 120 and other like factors.

FIGS. 4B and 4C are schematic cross-sectional side views of two types of connection between bus bar 140 and cell terminal 134, in accordance with some examples. In FIG. 4B, the main portion of bus bar 140 is offset (along the Y-axis) relative to cell terminal 134 such that this main portion of bus bar 140 and cell terminal 134 are positioned next to each other. Bus bar 140 may comprise connecting link 145 for each cell terminal 134, extending from the main portion of bus bar 140. In some examples, this connecting link 145 is operable as a fusible link. The thickness or, more specifically, the cross-sectional area of connecting link 145 can be less than that of the main portion of bus bar 140 since, in some examples, connecting link 145 needs to support lower current ratings than the main portion of bus bar 140 (e.g., with parallel cell connections). In some examples, the thickness of connecting link 145 is selected to enable the welding of connecting link 145 to cell terminal 134. Connecting link 145 can be welded to or can be monolithic with the main portion of bus bar 140.

Referring to FIG. 4C, in some examples, bus bar 140 is positioned on the top of cell terminal 134. In this example, bus bar 140 can have bus bar opening 146 (e.g., a through opening or a blunt opening shown in FIG. 4C) that enables the welding of bus bar 140 to cell terminal 134. For example, the blunt opening may be used to form a portion of bus bar 140 that has a reduced thickness suitable for welding this portion to cell terminal 134. The rest of bus bar 140 can have a thickness suitable for current carrying. When a through opening is used, the welding can be performed around the circumference of this opening.

In some examples, bus bars 140 comprise a plurality of disjoined components, forming first bus-bar row 141 and second bus-bar row 142. In more specific examples, bus bars 140 in first bus-bar row 141 are connected to cell terminals 134 having one polarity (e.g., positive cell terminals), while bus bars 140 in second bus-bar row 142 are connected to cell terminals 134 having the other polarity (e.g., negative cell terminals). Since cell terminals 134 are positioned on top surfaces 131 (in the example shown in FIG. 4A), bus bars 140 are also positioned next to top surfaces 131. Furthermore, the interconnecting parts of first bus-bar row 141 and second bus-bar row 142 extend parallel to primary axis 129 of battery module 120.

FIG. 4A illustrates each first bus-bar row 141 and second bus-bar row 142 is formed by three separate bus-bar components. One of these bus-bar components comprises contact plate 143 to form an external electrical connection to these components. Contact plate 143 protrudes away from the interconnecting parts in a direction substantially perpendicular to primary axis 129. FIG. 4A illustrates an example where contact plates 143 are positioned on opposite sides of the stack formed by prismatic battery cells 130. However, an example where contact plates 143 are positioned on the same side of the stack is also within the scope. In some examples, contact plates 143 comprises opening 144 for protruding an electrical connector that forms the electrical connection.

It should be noted that during the operation of battery module 120, bus bars 140 are immersion-cooled as further described below. As such, the cross-section of bus bars 140 can be reduced in comparison to bus bars that are not cooled thereby allowing some resistive heating within bus bars 140. For example, the temperature coefficient of copper is about 0.00404 $C^{-1}$. Therefore, increasing the temperature of copper bus bars by 50° C. will cause the resistivity to increase by about 20%. Without the temperature control of bus bars 140, the dimensions of bus bars 140 need to accommodate the highest operating temperature. It should be noted that the heating of bus bars 140 can be caused by receiving the heat from battery cells 130 and also from the internal resistive heating. However, increasing the size of bus bars 140 (to accommodate for higher operating temperatures) is highly undesirable since this increases the weight and size of bus bars 140 (and as a result of battery module 120). Furthermore, bus bars 140 can be used (in addition to thermal liquid 105) for transferring the heat between battery cells 130.

Figure 5A:
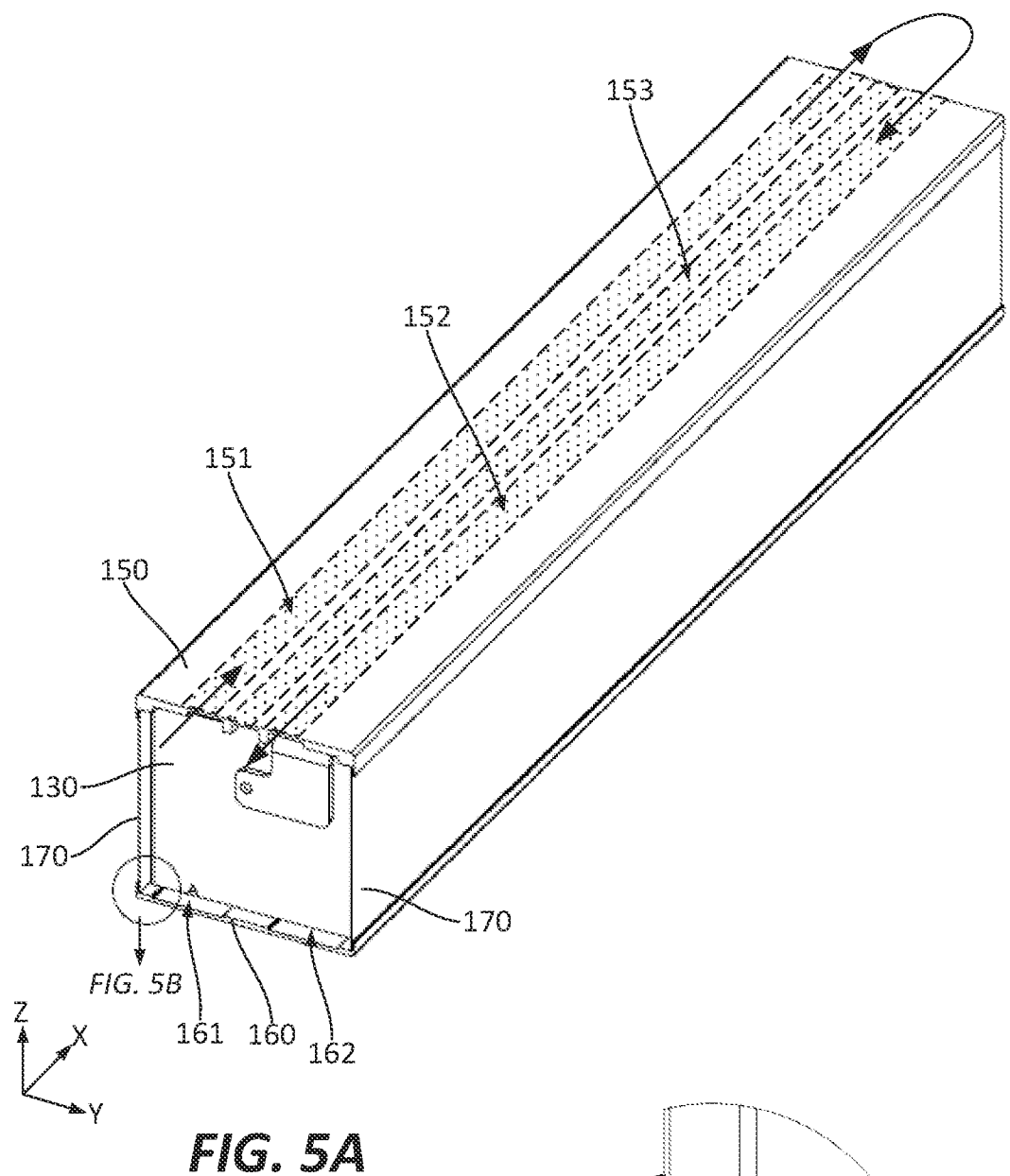
FIG. 5A is a schematic perspective view of a stack of prismatic battery cells partially enclosed with top, bottom, and side covers, in accordance with some examples.
Figure 5B:
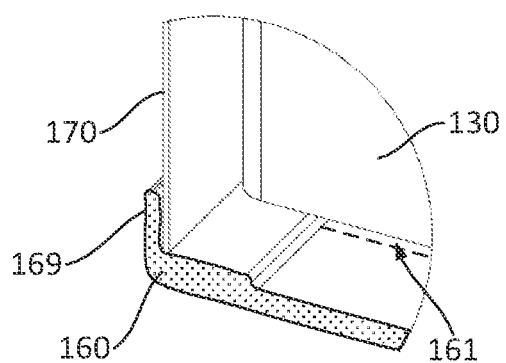
FIG. 5B is a schematic expanded view of a corner of the stack of prismatic battery cells in FIG. 5A.
Figure 5C:
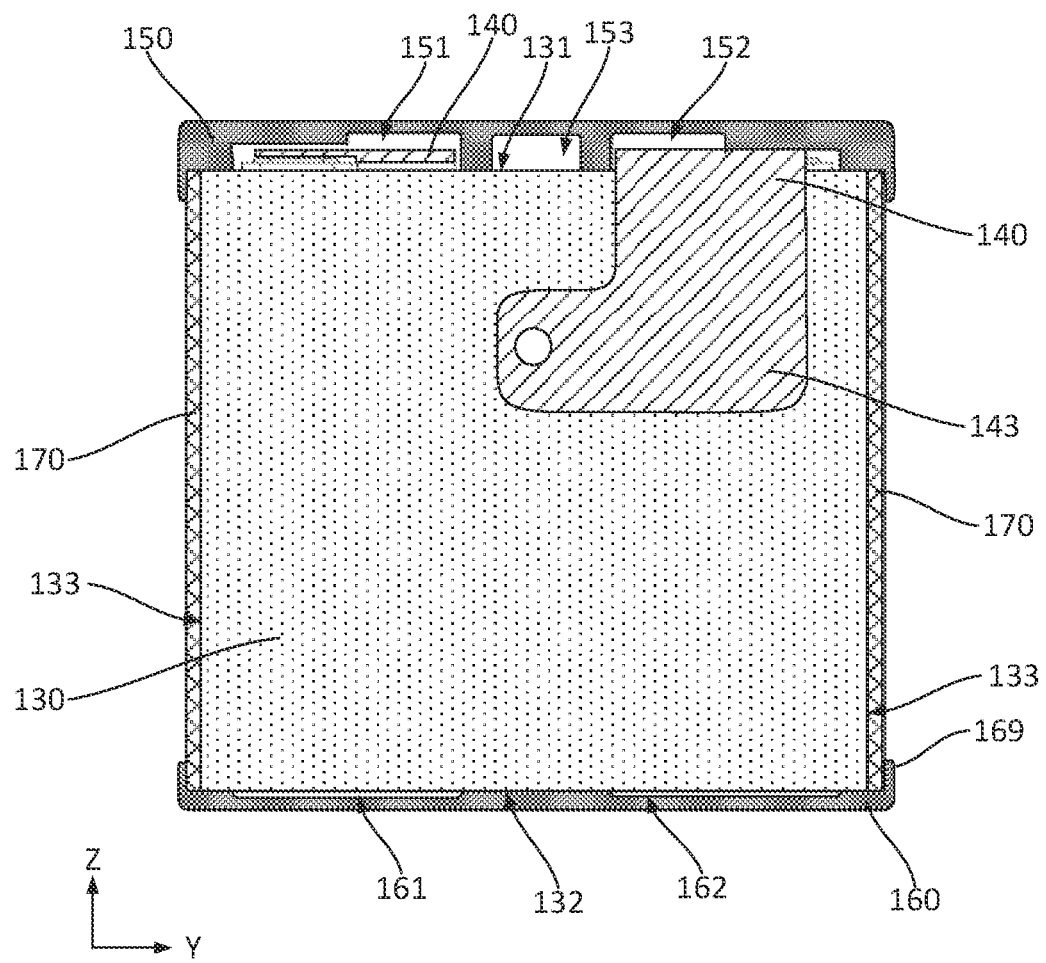
FIG. 5C is a schematic front view of the stack of prismatic battery cells in FIG. 5A.

Referring to FIGS. 5A-5C, battery module 120 comprises top cover 150 and bottom cover 160. In some examples, battery module 120 also comprises side covers 170, which can be optional. Top cover 150 and bottom cover 160 can be formed from various suitable insulating materials, such as plastic.

As shown in FIG. 5C, top cover 150 is attached to prismatic battery cells 130, facing top surfaces 131. For example, top cover 150 can be glued directly to top surfaces 131 of prismatic battery cells 130. For example, epoxy, polyurethane, and other types of adhesives can be used for these purposes.

When side covers 170 are present, top cover 150 may overlap and be glued (e.g., epoxy, polyurethane) to side covers 170, e.g., as shown in FIG. 5C. In some examples, top cover 150 can be glued to both top surfaces 131 and side surfaces 133 of prismatic battery cells 130. For example, top cover 150 can extend side lips that overlap with side surfaces 133 and can be glued to side surfaces 133. Top cover 150 also forms first top fluid channel 151 and second top fluid channel 152, each fluidically open to prismatic battery cells 130. Specifically, each first top fluid channel 151 and second top fluid channel 152 are enclosed. In some examples, each first top fluid channel 151 and second top fluid channel 152 has a rectangular cross-sectional profile such that three sides are formed by top cover 150 while the remaining fourth side is formed by top surfaces 131 of prismatic battery cells 130.

In a similar manner, bottom cover 160 is attached to prismatic battery cells 130, facing bottom surfaces 132, and forms first bottom fluid channel 161 and second bottom fluid channel 162, each fluidically open to prismatic battery cells 130. For example, bottom cover 160 can be glued directly to bottom surfaces 132 of prismatic battery cells 130. When side covers 170 are present, bottom cover 160 may overlap and may be glued to side covers 170, e.g., as shown in FIG. 5C.

Overall, each prismatic battery cell 130 is immersed/comes in contact with the thermal liquid provided in all four fluid channels, i.e., first top fluid channel 151, second top fluid channel 152, first bottom fluid channel 161, and second bottom fluid channel 162. Each prismatic battery cell 130 is cooled or, more generally, thermally managed from top surface 131 and bottom surface 132 thereby ensuring more a uniform temperature profile within prismatic battery cell 130 (e.g., in comparison to one-sided cooling of battery cells). Furthermore, first top fluid channel 151 and second top fluid channel 152 are also used for cooling bus bars 140. For example, first bus-bar row 141 protrudes into first top fluid channel 151 while second bus-bar row 142 protrudes into second top fluid channel 152.

In general, the width of these fluid channels is determined by the width of battery cells 130. The fluid channels can be as wide as possible considering that top cover 150 and bottom cover 160 need to be supported relative to battery cells 130 (e.g., at least around edges) and also considering that both top channels need to be separated from each other (and only fluidically interconnected by second end plate 122). Otherwise, the width of these fluid channels can be maximized to provide maximum contact and heat transfer with battery cells 130. In other words, the fluid channels are designed to expose as much of top surfaces 131 and bottom surfaces 132 of battery cells 130 as possible. On other hands, the height of these fluid channels can be minimal to reduce the thickness of top cover 150 and bottom cover 160 and the total height of battery module 120.

Referring to FIG. 5C, in some examples, top cover 150 forms gas-venting channel 153 fluidically open to pressure-release burst valves 136. In case one or more prismatic battery cells 130 experience internal over-pressurization, the corresponding pressure-release burst valves 136 open and release internal gases (and possibly other matter) from these cells into gas-venting channel 153 thereby allowing to depressurize the cells. In some examples, gas-venting channel 153 is fluidically isolated from other components, e.g., bus bars 140, thereby preventing further propagation of unsafe conditions and even potentially continuing the operation of battery module 120. In some examples, one or both of first end plate 121 and second end plate 122 comprises burst valves to vent gases from battery module 120 (e.g., when the pressure inside gas-venting channel 153 exceeds a set threshold).

Figure 6A:
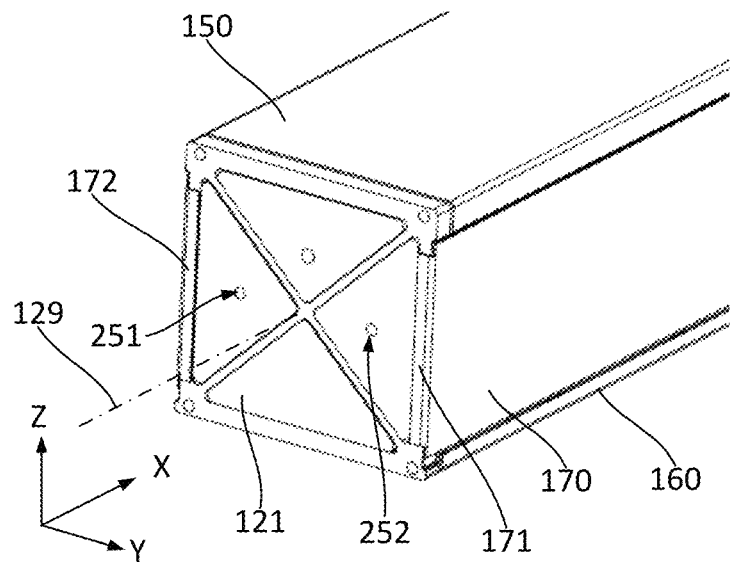
FIG. 6A is a schematic perspective view of a battery module illustrating a first cover attached to the top, bottom, and side covers, in accordance with some examples.

In some examples, battery module 120 further comprises side covers 170, facing side surfaces 133 of prismatic battery cells 130. Each side cover 170 is attached to top cover 150 and to bottom cover 160. For example, FIG. 5B illustrates bottom cover 160 comprising side lips 169 that overlaps with and glued to side covers 170. Top cover 150 can have a similar lip that overlaps with side covers 170. In some examples, side covers 170 are also attached to first end plate 121 and second end plate 122. For example, side covers 170 comprises first lip 171 and second lip 172 extending perpendicular to primary axis 129. For example, FIG. 6A illustrates first lip 171. First lip 171 overlaps with and is attached to first end plate 121 such that a portion of first end plate 121 extends between first lip 171 and prismatic battery cells 130. Similarly, second lip 172 overlaps with and is attached to second end plate 122 such that a portion of second end plate 122 extends between second lip 172 and prismatic battery cells 130.

Side covers 170 can be formed from aluminum and are used to provide the structural integrity to battery module 120. In some examples, a side of side covers 170 facing prismatic battery cells 130 is made from an electrically insulating material such as rubber or polymer (e.g., sprayed on battery cells 130 and/or side covers 170) to insulate the metal base of side covers 170 from prismatic battery cells 130. Even though the cases of prismatic battery cells 130 can be neutral, the electrical isolation can help to improve the overall module safety. In some examples, side covers 170 are formed from an insulating material (e.g., carbon fiber, glass fiber). Side covers 170 also provide structural support within battery module 120.

Figure 6B:
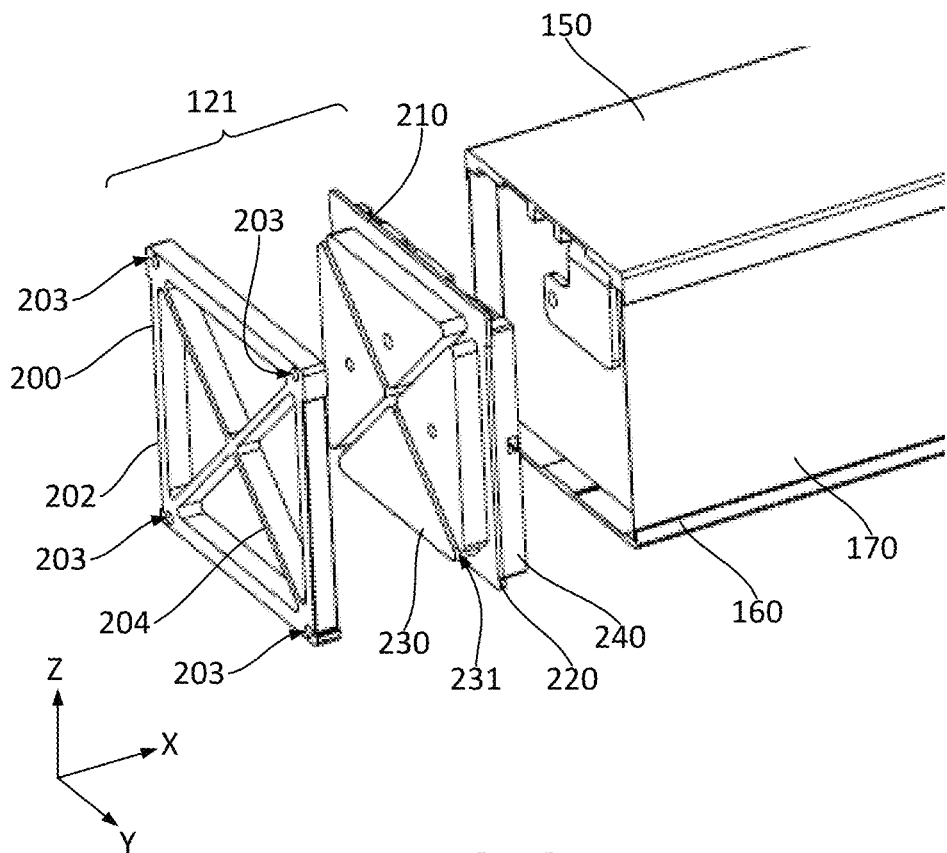
FIG. 6B is a schematic perspective view of the battery module in FIG. 6A, with an exploded view of the first cover.

Referring to FIGS. 6A and 6B, battery module 120 comprises first end plate 121, which is attached (e.g., glued or, more specifically, sealed to) to both top cover 150 and bottom cover 160. When side covers 170 are present, first end plate 121 is also attached (e.g., glued) to side covers 170. Second end plate 122 is attached to both top cover 150 and bottom cover 160 and fluidically interconnecting first top fluid channel 151 and first bottom fluid channel 161 and, separately, fluidically interconnecting second top fluid channel 152 and second bottom fluid channel 162.

Referring to FIGS. 6A and 6B, in some examples, first end plate 121 comprises first fluid port 251 and second fluid port 252, used for fluidic connection of battery module 120 to other components of electric vehicle 100, e.g., thermal management system 104. Specifically, first fluid port 251 and second fluid port 252 allow for thermal liquid 105 to flow into and out of battery module 120 and can be referred to as inlet and outlet ports. First end plate 121 also help to fluidically couple these ports to other fluid channels within battery module 120 thereby controlling the distribution of thermal liquid 105 within battery module 120. Specifically, first fluid port 251 is fluidically coupled to both first top fluid channel 151 and first bottom fluid channel 161. Separately, second fluid port 252 is fluidically coupled to both second top fluid channel 152 and second bottom fluid channel 162. It should be noted that a combination of first fluid port 251, first top fluid channel 151, and first bottom fluid channel 161 are fluidically isolated from second fluid port 252, second top fluid channel 152, and second bottom fluid channel 162 at first end plate 121. However, first top fluid channel 151 and second top fluid channel 152 and, separately, second top fluid channel 152 and second bottom fluid channel 162 are fluidically interconnected by second end plate 122 as further described below. As such, a combination of first end plate 121 and second end plate 122 provides both distribution and looping of thermal liquid 105 within battery module 120. In this example, both first fluid port 251 and second fluid port 252 are positioned on the same side of battery module 120, i.e., first end plate 121, which helps with routing fluid connectors 114 (e.g., pipes, hoses) to the same side of battery module 120. However, examples, where first fluid port 251 and second fluid port 252 are different sides of battery module 120, are also within the scope.

Figure 7A:
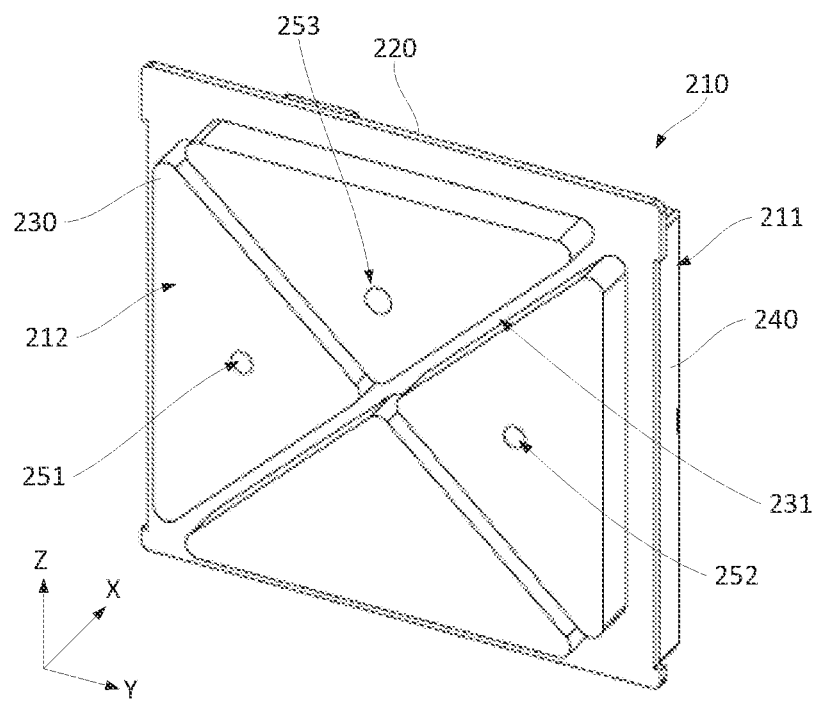
FIGS. 7A and 7B are perspective front and back views of a first cover, in accordance with some examples.
Figure 7B:
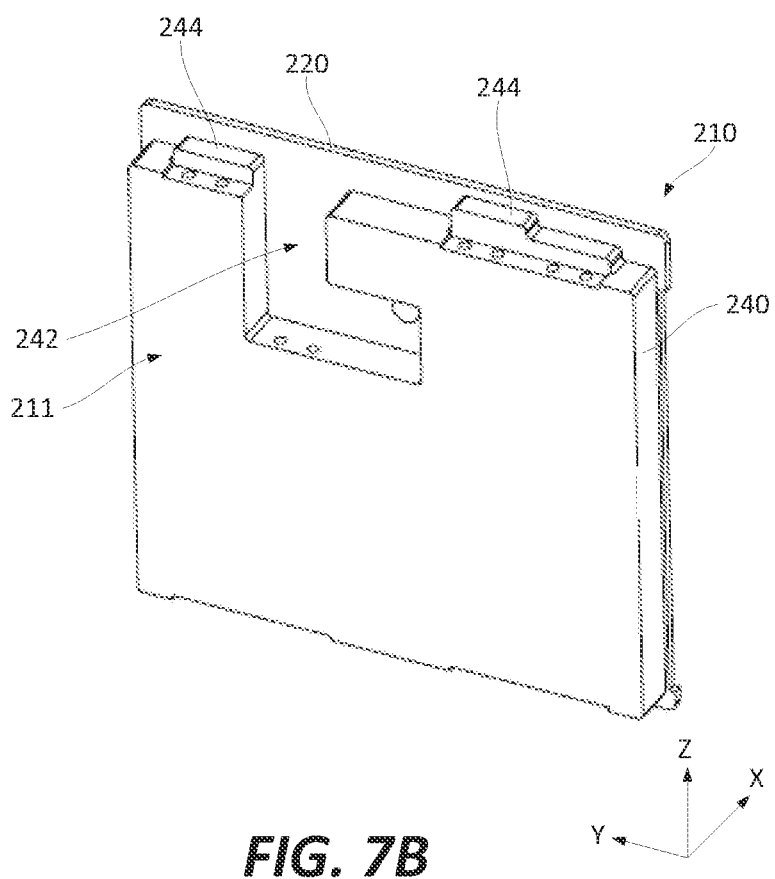
Figure 7C:
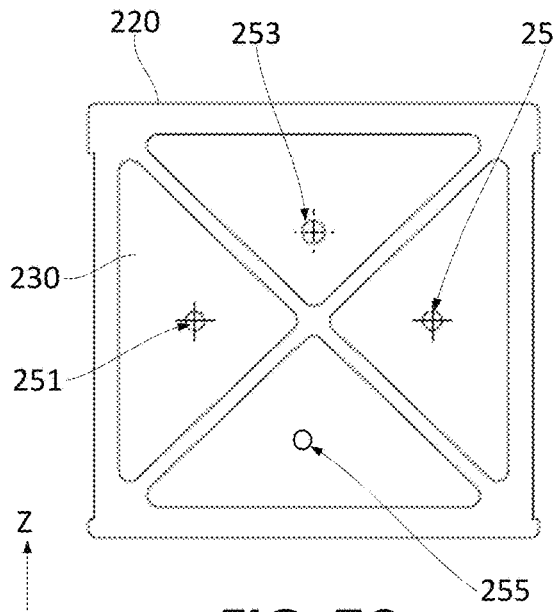
FIGS. 7C and 7D are front and back views of the first cover in FIG. 7A.

Referring to FIGS. 7A and 7C, In some examples, first end plate 121 comprises first contact opening 253 overlapping with first contact plate 143. First contact opening 253 can be used to form an electrical connection to first contact plate 143, e.g., by protruding a conductive terminal (not shown). It should be noted that this protruding terminal is sealed against first end plate 121 since first contact plate 143 is positioned on the thermal liquid side and this seal prevents the thermal liquid from leaking outside of battery module 120.

In some examples, first end plate 121 comprises signal-trace opening 255, which can be used to protrude various wires/voltage leads through first end plate 121. These wires/voltage leads can also be sealed against first end plate 121 to prevent the thermal liquid from leaking outside of battery module 120.

Referring to FIGS. 6A and 6B, in some examples, first end plate 121 comprises first reinforcement element 200 and first cover 210 formed from different materials. For example, first reinforcement element 200 can be formed from metal, such as aluminum, steel, and the like. First cover 210 can be formed from plastic. The material of first cover 210 can be selected such that first cover 210 provides electric isolation of battery cells 130 from the environment and other conductive components. Furthermore, the material of first cover 210 can simplify the fabrication of first cover 210 such as forming various internal channels for the distribution of thermal liquid 105. At the same time, first reinforcement element 200 provides structural support to first cover 210 and enables battery module 120 to connect to other battery modules as further described below. First cover 210 is inserted into the cavity formed by top cover 150, bottom cover 160, and side covers 170 and is sealed against each of these components. Furthermore, first reinforcement element 200 can be glued or otherwise attached to one or more (e.g., all) of top cover 150, bottom cover 160, and side covers 170. In some examples, side covers 170 bend around the edge of first reinforcement element 200 forming a lip, e.g., as shown in FIG. 6A. In the same or other examples, first cover 210 is at least partially positioned between first reinforcement element 200 and prismatic battery cells 130.

Referring to FIG. 6B, in some examples, first cover 210 comprises first-cover center portion 220 and first-cover outer protrusion 230, monolithic with and extending from first-cover center portion 220 away from prismatic battery cells 130. First-cover outer protrusion 230 comprises multiple pieces separated by first-cover channels 231, extending through first-cover outer protrusion 230 to first-cover center portion 220. First reinforcement element 200 comprises first reinforcement frame 202 and first reinforcement cross-member 204 such that first reinforcement frame 202 surrounds first-cover outer protrusion 230 while first reinforcement cross-member 204 protrudes into first-cover channels 231. This overlap (and the increased contact area) between first reinforcement element 200 and first cover 210, provide greater support to first cover 210 by first reinforcement element 200.

Referring to FIG. 6B, in some examples, first cover 210 further comprises first-cover inner protrusion 240, monolithic with and extending from first-cover center portion 220 toward prismatic battery cells 130. First-cover inner protrusion 240 extends into an opening formed by top cover 150 and bottom cover 160 and is attached to each of top cover 150 and bottom cover 160.

Referring to FIG. 7B, in some examples, first-cover inner protrusion 240 comprises cutout 242 such that a portion of first bus-bar row 141 extends into cutout 242.

Figure 7D:
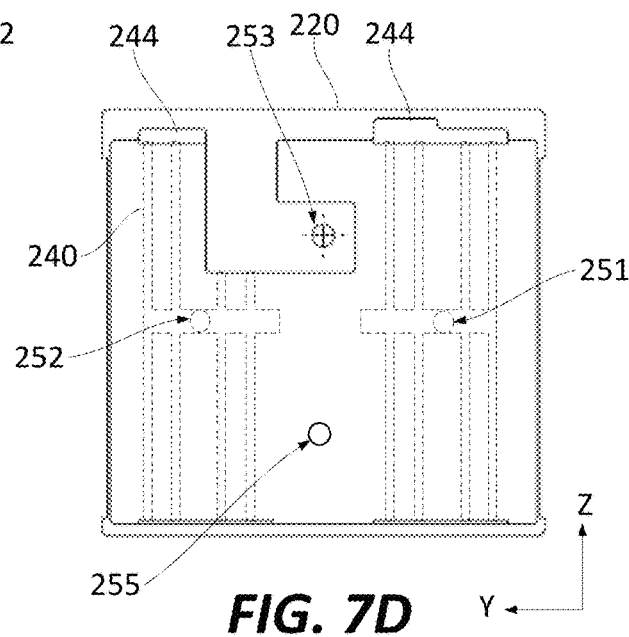
Figure 7E:
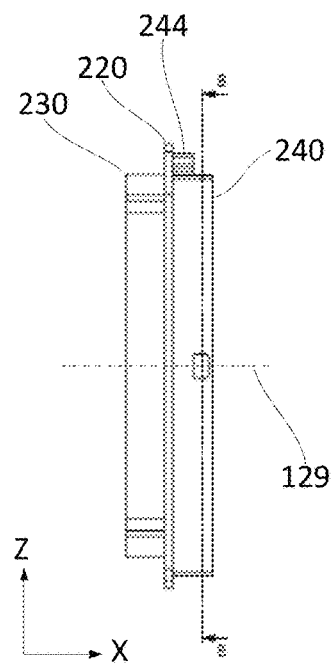
FIG. 7E is a side view of the first cover in FIG. 7A.

Referring to FIGS. 7B, 7D, and 7E, in some examples, first-cover inner protrusion 240 comprises sealing extensions 244 protruding into and sealing first top fluid channel 151, second top fluid channel 152, first bottom fluid channel 161, and second bottom fluid channel 162.

Figure 7F:
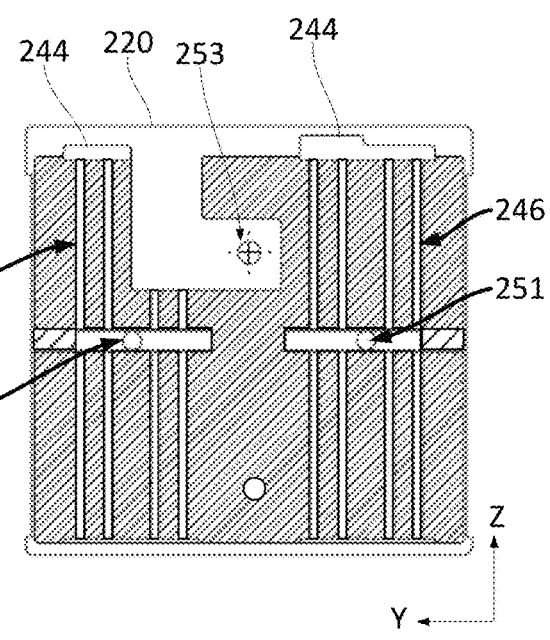
FIG. 7F is a cross-sectional view of the first cover in FIG. 7A.

Referring to FIG. 7F, in some examples, first-cover inner protrusion 240 comprises first set of internal fluid channels 246 fluidically coupling first fluid port 251 with both first top fluid channel 151 and first bottom fluid channel 161. First-cover inner protrusion 240 comprises second set of internal fluid channels 248 fluidically coupling second fluid port 252 with both second top fluid channel 152 and second bottom fluid channel 162.

Figure 7G:
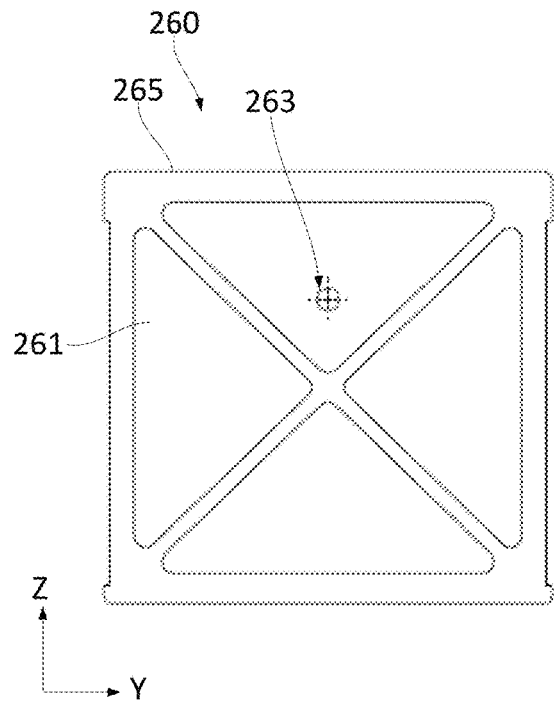
FIGS. 7G and 7H are front and cross-sectional views of a second-cover center portion, in accordance with some examples.
Figure 7H:
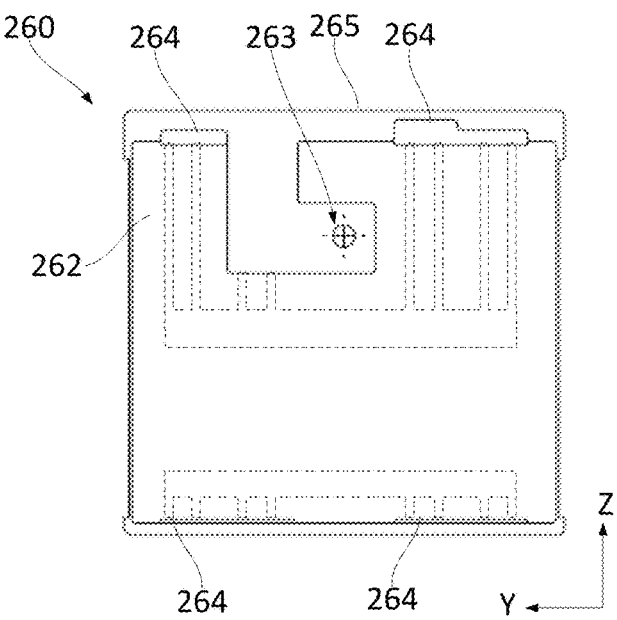

First end plate 121 and second end plate 122 may have many similar features. For example, reinforcement elements of first end plate 121 and second end plate 122 may be substantially similar or even the same (and interchangeable). On other hand, first cover 210 and second cover 260 can have different designs. For example, first cover 210 comprises fluid port 251 and second fluid port 252 (operable as an inlet and outlet and described above), while second cover 260 may not have any such ports, e.g., as schematically shown in FIGS. 7G and 7H. It should be noted that positioning both inlet and outlet on the same side of battery module 120 is used to achieve uniform heat transfer from different battery cells as will now be described with reference to battery module cooling and FIG. 7I in the context of first top fluid channel 151 and second top fluid channel 152. One having ordinary skill in the art would understand that the same approach applies to battery module heating as well as first bottom fluid channel 161 and second bottom fluid channel 162.

Figure 7I:
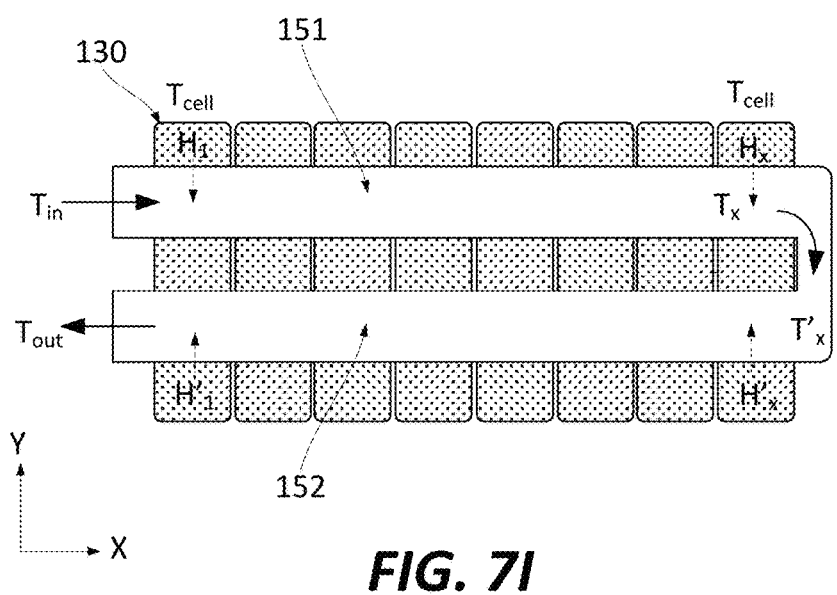
FIG. 7I is a schematic representation of thermal modeling in a battery module, in accordance with some examples.

Referring to FIG. 7I, as the thermal liquid having an inlet temperature ($T_{in}$) enters battery module 120, the thermal liquid receives the heat ($H_1$) and increases the fluid temperature as the fluid continues to flow through the module. For example, upon reaching the last cell in this series, the fluid temperature ($T_x$) will be higher that the inlet temperature ($T_x > T_{in}$). Assuming that all battery cells have the same temperature ($T_{cell}$), the first cell that comes in contact with the immediately incoming (colder) fluid will lose more heat than any subsequent cell in this series since the heat transfer is proportional to the temperature gradient between the cell and the fluid. For example, the heat transfer from the last cell in this series ($H_x \propto T_{cell} - T_x$) will be smaller than the heat transfer from the first cell in this series ($H_1 \propto T_{cell} - T_{in}$) due to the thermal liquid heating and the thermal gradient reduction ($T_{in}<T_x \rightarrow H_1>H_x$). If the thermal liquid is not looped and allowed to exit on the other side of the battery module, then the first cell will be cooled more than the last cell. However, when the thermal liquid is looped and has both first top fluid channel 151 and second top fluid channel 152 (both providing fluidic contact to each cell), there is additional heat transfer occurs from each cell. Specifically, the heat transfer provided by first top fluid channel 151 is described above resulting in the first cell will be cooled more than the last cell. However, as the thermal liquid is directed from first top fluid channel 151 to second top fluid channel 152, the order of the cell experiencing the flow is flipped while the thermal liquid continues to heat. The last cell sees this return flow first and experiences additional heat transfer ($H'_x \propto T_{cell} - T'_x$). The first cell sees this return flow last and also experiences additional heat transfer ($H'_1 \propto T_{cell} - T_{out}$). Since the thermal liquid continues to heat ($T_{out} > T'_x$), the last cell is now cooled more ($H'_x > H'_1$). Combining the two heat transfers (provided by first top fluid channel 151 to second top fluid channel 152), the total heat transfer is more balanced ($H_x + H'_x \sim H_1 + H'_1$) than the heat transfer provided by each of the channels individually.

Returning to FIGS. 7G and 7H, second cover 260 comprises second contact opening 263, which is used for connecting to one of bus bars 140. In other words, one connection to bus bars 140 is formed through first contact opening 253 in first cover 210, while the other connection to bus bars 140 is formed through second contact opening 263 in second cover 260. Having such connections on the opposite sides of battery module 120 allows forming various connections among modules. Alternatively, both contact openings are positioned on the same cover (e.g., the cover that also includes fluid ports or the cover that does not include any fluid ports).

Similar to first cover 210, second cover 260 comprises second-cover center portion 265 as well as second-cover outer protrusion 261 and second-cover inner protrusion 262, extending in opposite sides from second-cover center portion 265. Second-cover inner protrusion 262 faces battery cells 130 and extends into the cavity formed by top cover 150, bottom cover 160, and side covers 170. In some examples, second-cover inner protrusion 262 is glued to each of top cover 150, bottom cover 160, and side covers 170. Furthermore, in some examples, second-cover inner protrusion 262 comprises additional sealing extensions 264 protruding into and sealing first top fluid channel 151, second top fluid channel 152, first bottom fluid channel 161, and second bottom fluid channel 162. Finally, second-cover inner protrusion 262 comprises inner channels that fluidically couple first top fluid channel 151 and second top fluid channel 152 and, separately, fluidically couple first bottom fluid channel 161 and second bottom fluid channel 162, e.g., as schematically shown in FIG. 7H.

Figure 8A:
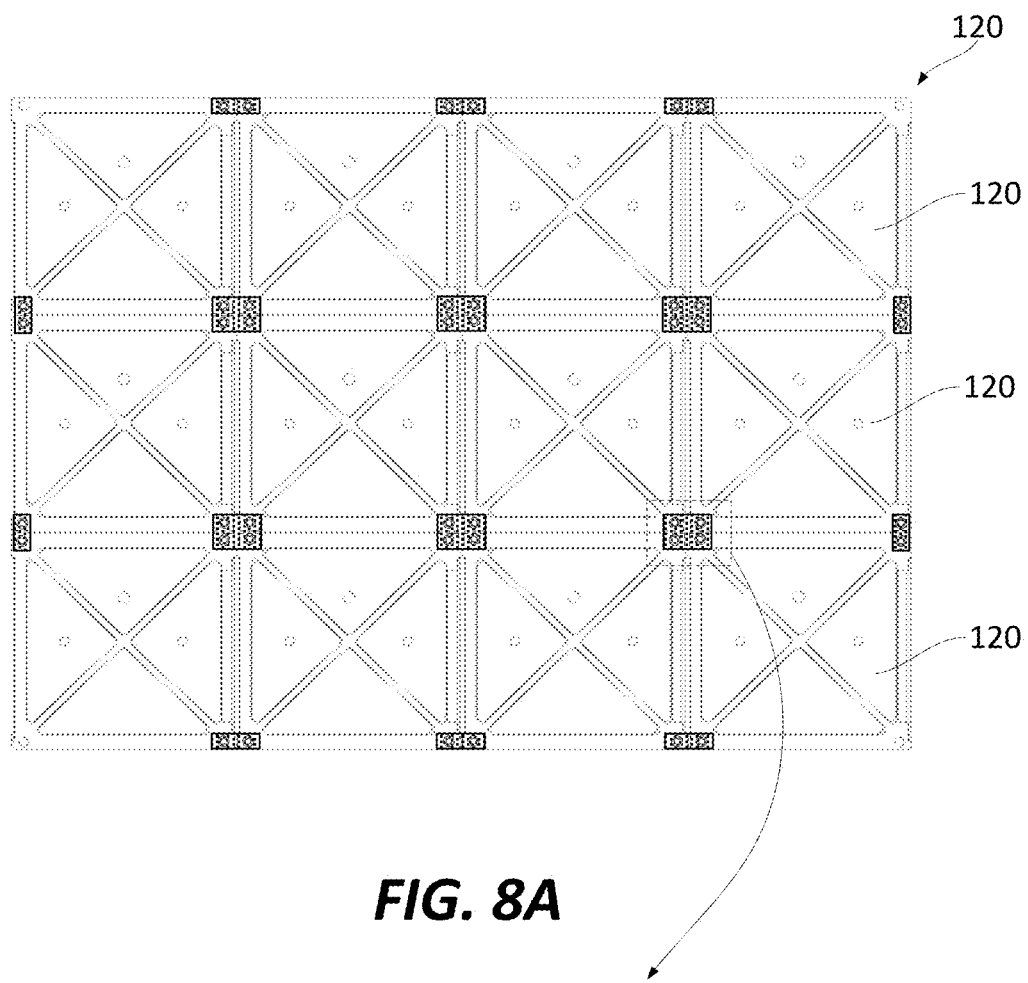
FIG. 8A is a schematic front view of a battery pack comprising 12 interconnected battery modules, in accordance with some examples.
Figure 8B:
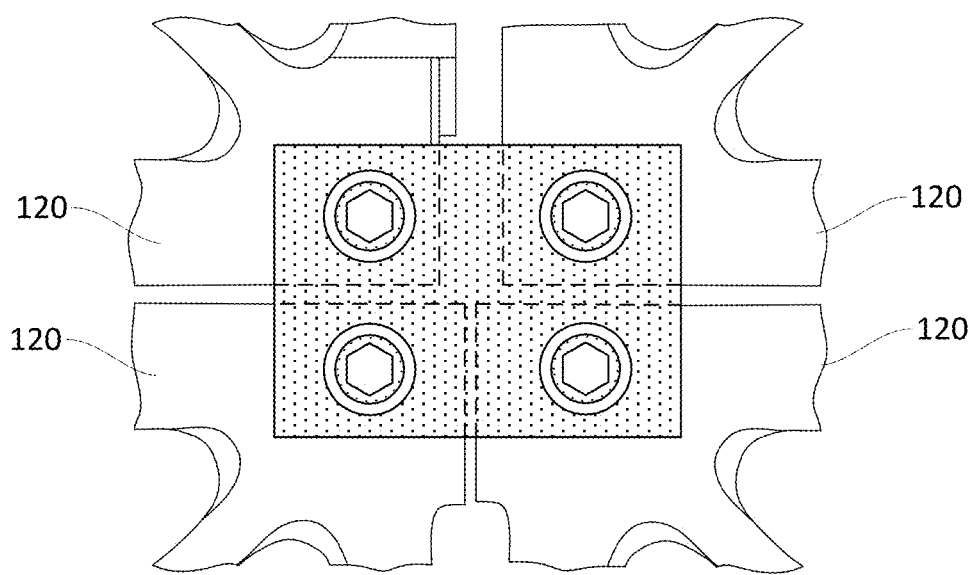
FIG. 8B is a schematic expanded view of an interconnecting plate used in the battery pack in FIG. 8A.

Referring to FIGS. 6A and 6B, in some examples, first reinforcement frame 202 comprises four openings 203, each positioned in a different corner of first reinforcement frame 202. Openings 203 can be used for connecting battery module 120 to other modules as shown in FIGS. 8A and 8B.

Examples of Methods of Fabricating Battery Modules

Figure 9:
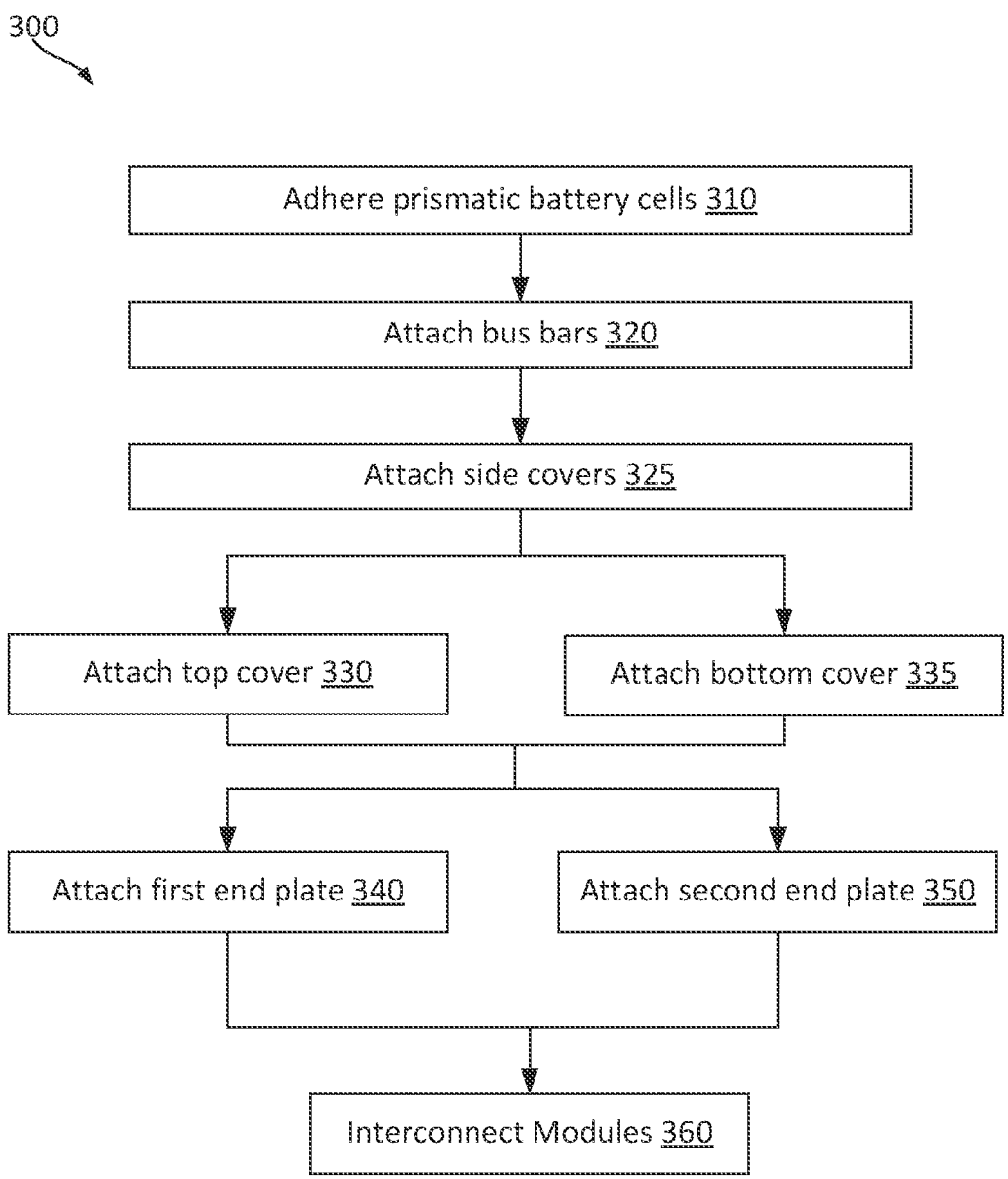
FIG. 9 is a process flowchart of a method for fabricating a battery module comprising immersion-cooled battery cells, in accordance with some examples.

FIG. 9 is a process flowchart corresponding to method 900 of fabricating battery module 120, in accordance with some examples. Method 900 may commence with (block 910) adhering prismatic battery cells 130 stacked along primary axis 129 of battery module 120 and comprising top surfaces 131, bottom surfaces 132 opposite to top surfaces 131, side surfaces 133 extending between top surfaces 131 and bottom surfaces 132, and cell terminals 134 positioned on top surfaces 131.

Method 900 may proceed with (block 920) attaching bus bars 140 to cell terminals 134. Bus bars 140 form first bus-bar row 141 and second bus-bar row 142 and interconnecting cell terminals 134. In some examples, method 900 comprises (block 925) attaching side covers 170.

Method 900 may proceed with (block 930) attaching top cover 150 to prismatic battery cells 130 and (block 935) attaching bottom cover 160. Specifically, after these attaching operations, top cover 150 faces top surfaces 131 and forms first top fluid channel 151 and second top fluid channel 152, each fluidically open to prismatic battery cells 130. Similarly, bottom cover 160 faces bottom surfaces 132 and forms first bottom fluid channel 161 and second bottom fluid channel 162, each fluidically open to prismatic battery cells 130.

Method 900 may proceed with (block 940) attaching first end plate 121 and (block 945) attaching second end plate 122. Specifically, first end plate 121 is attached to both top cover 150 and bottom cover 160 and comprises first fluid port 251 and second fluid port 252. As described above, first fluid port 251 is fluidically coupled to both first top fluid channel 151 and first bottom fluid channel 161. Second fluid port 252 is fluidically coupled to both second top fluid channel 152 and second bottom fluid channel 162. Second end plate 122 fluidically interconnects first top fluid channel 151 and first bottom fluid channel 161 and, separately, fluidically interconnects second top fluid channel 152 and second bottom fluid channel 162.

The invention claimed is:

1. A battery module for immersion cooling using a thermal liquid, the battery module comprising:
   prismatic battery cells stacked along a primary axis of the battery module and comprising top surfaces, bottom surfaces opposite to top surfaces, side surfaces extending between the top surfaces and the bottom surfaces, and cell terminals positioned on the top surfaces;
   bus bars forming a first bus-bar row and a second bus-bar row and interconnecting the cell terminals;
   a top cover attached to the prismatic battery cells, facing the top surfaces, and forming a first top fluid channel and a second top fluid channel for flowing the thermal liquid, wherein:
      the first top fluid channel is fluidically open to each of the prismatic battery cells thereby allowing the thermal liquid to directly contact each of the prismatic battery cells while flowing through the first top fluid channel, and
      the second top fluid channel is fluidically open to each of the prismatic battery cells thereby allowing the thermal liquid to directly contact each of the prismatic battery cells while flowing through the second top fluid channel;
   a bottom cover attached to the prismatic battery cells, facing the bottom surfaces, and forming a first bottom fluid channel and a second bottom fluid channel for flowing the thermal liquid, wherein:
      the first bottom fluid channel is fluidically open to each of the prismatic battery cells thereby allowing the thermal liquid to directly contact each of the prismatic battery cells while flowing through the first bottom fluid channel, and
      the second bottom fluid channel is fluidically open to each of the prismatic battery cells thereby allowing the thermal liquid to directly contact each of the prismatic battery cells while flowing through the second bottom fluid channel;

a first end plate attached to both the top cover and the bottom cover and comprising a first fluid port and a second fluid port, wherein:

the first fluid port is fluidically coupled to both the first top fluid channel and the first bottom fluid channel such that the thermal liquid is distributed to the first top fluid channel and the first bottom fluid channel upon entering the first fluid port, and the second fluid port is fluidically coupled to both the second top fluid channel and the second bottom fluid channel such that the thermal liquid is collected from the second top fluid channel and the second bottom fluid channel prior to leaving the battery module through the second fluid port; and a second end plate attached to both the top cover and the bottom cover, wherein:

the second end plate fluidically interconnects the first top fluid channel and the second top fluid channel, and, separately, the second end plate fluidically interconnects the first bottom fluid channel and the second bottom fluid channel.

2. The battery module of claim 1, wherein each of the top surfaces, the bottom surfaces, and the side surfaces is substantially parallel to the primary axis.

3. The battery module of claim 1, wherein each adjacent pair of the prismatic battery cells is mechanically interconnected by an adhesive layer extending between the prismatic battery cells in each adjacent pair.

4. The battery module of claim 1, wherein each of the prismatic battery cells has a height, length, and a thickness such that the thickness is less than each of the height and the length and such that the thickness is parallel to the primary axis of the battery module.

5. The battery module of claim 1, wherein the bus bars and the cell terminals extend into the first top fluid channel and the second top fluid channel, thereby being in direct contact with the thermal liquid.

6. The battery module of claim 1, wherein:

the prismatic battery cells further comprise pressure-release burst valves, positioned on the top surfaces, the top cover forms a gas-venting channel fluidically open to the pressure-release burst valves, the gas-venting channel is positioned between and fluidically isolated from each of the first top fluid channel and the second top fluid channel.

7. The battery module of claim 1, wherein:

the first bus-bar row comprises a first contact plate, extending perpendicular to the primary axis between the prismatic battery cells and the first end plate, the first end plate comprises a first contact opening overlapping with the first contact plate.

8. The battery module of claim 1, further comprising side covers facing the side surfaces of the prismatic battery cells, each is attached to the top cover and to the bottom cover.

9. The battery module of claim 8, wherein the bottom cover comprises side lips, overlapping with and glued to the side covers.

10. The battery module of claim 8, wherein:

each of the side covers comprises a first lip and a second lip extending perpendicular to the primary axis;

the first lip overlaps with and is attached to the first end plate such that a portion of the first end plate extends between the first lip and the prismatic battery cells; and the second lip overlaps with and is attached to the second end plate such that a portion of the second end plate extends between the second lip and the prismatic battery cells.

11. The battery module of claim 1, wherein the top cover is glued to at least the top surfaces or the side surfaces of the prismatic battery cells.

12. The battery module of claim 11, wherein the top cover is glued to both the top surfaces and the side surfaces of the prismatic battery cells.

13. The battery module of claim 1, wherein:

the first end plate comprises a first reinforcement element and a first cover formed from different materials, the first cover is at least partially positioned between the first reinforcement element and the prismatic battery cells.

14. The battery module of claim 13, wherein:

the first cover comprises a first-cover center portion and a first-cover outer protrusion, monolithic with and extending from the first-cover center portion away from the prismatic battery cells;

the first-cover outer protrusion comprises multiple pieces separated by first-cover channels, extending through the first-cover outer protrusion to the first-cover center portion; and the first reinforcement element comprises a first reinforcement frame and a first reinforcement cross-member such that the first reinforcement frame surrounds the first-cover outer protrusion while the first reinforcement cross-member protrudes into the first-cover channels.

15. The battery module of claim 14, wherein the first reinforcement frame comprises four openings, each positioned in a different corner of the first reinforcement frame.

16. The battery module of claim 14, wherein:

the first cover further comprises a first-cover inner protrusion, monolithic with and extending from the first-cover center portion toward the prismatic battery cells; and the first-cover inner protrusion extends into an opening formed by the top cover and the bottom cover and is attached to each of the top cover and the bottom cover.

17. The battery module of claim 16, wherein the first-cover inner protrusion comprises a cutout such that a portion of the first bus-bar row extends into the cutout.

18. The battery module of claim 16, wherein the first-cover inner protrusion comprises sealing extensions protruding into and sealing the first top fluid channel, the second top fluid channel, the first bottom fluid channel, and the second bottom fluid channel.

19. The battery module of claim 16, wherein:

the first-cover inner protrusion comprises a first set of internal fluid channels fluidically coupling the first fluid port with both the first top fluid channel and the first bottom fluid channel, and the first-cover inner protrusion comprises a second set of internal fluid channels fluidically coupling the second fluid port with both the second top fluid channel and the second bottom fluid channel.

20. A method of fabricating a battery module, the method comprises:

adhering prismatic battery cells stacked along a primary axis of the battery module and comprising top surfaces, bottom surfaces opposite to top surfaces, side surfaces extending between the top surfaces and the bottom surfaces, and cell terminals positioned on the top surfaces;

attaching bus bars to the cell terminals, wherein the bus bars form a first bus-bar row and a second bus-bar row and interconnecting the cell terminals;

attaching a top cover to the prismatic battery cells, facing the top surfaces, and forming a first top fluid channel and a second top fluid channel, each fluidically open to the prismatic battery cells, wherein:

the first top fluid channel is fluidically open to each of the prismatic battery cells thereby allowing the thermal liquid to directly contact each of the prismatic battery cells while flowing through the first top fluid channel during operation of the battery module, and the second top fluid channel is fluidically open to each of the prismatic battery cells thereby allowing the thermal liquid to directly contact each of the prismatic battery cells while flowing through the second top fluid channel during the operation of the battery module;

attaching a bottom cover attached to the prismatic battery cells, facing the bottom surfaces, and forming a first bottom fluid channel and a second bottom fluid channel, each fluidically open to the prismatic battery cells, wherein:

the first bottom fluid channel is fluidically open to each of the prismatic battery cells thereby allowing the thermal liquid to directly contact each of the prismatic battery cells while flowing through the first bottom fluid channel during the operation of the battery module, and the second bottom fluid channel is fluidically open to each of the prismatic battery cells thereby allowing the thermal liquid to directly contact each of the prismatic battery cells while flowing through the second bottom fluid channel during the operation of the battery module;

attaching a first end plate to both the top cover and the bottom cover and comprising a first fluid port and a second fluid port, wherein:

the first fluid port is fluidically coupled to both the first top fluid channel and the first bottom fluid channel such that the thermal liquid is distributed to the first top fluid channel and the first bottom fluid channel upon entering the first fluid port during the operation of the battery module, and the second fluid port is fluidically coupled to both the second top fluid channel and the second bottom fluid channel such that the thermal liquid is collected from the second top fluid channel and the second bottom fluid channel prior to leaving the battery module through the second fluid port during the operation of the battery module; and attaching a second end plate to both the top cover and the bottom cover and fluidically interconnecting the first top fluid channel and the second top fluid channel and, separately, fluidically interconnecting the first bottom fluid channel and the second bottom fluid channel.

* * * * *